United States Patent
Littleton et al.

(10) Patent No.: US 12,539,298 B2
(45) Date of Patent: Feb. 3, 2026

(54) LOBINALINE N-OXIDES AS POSITIVE ALLOSTERIC MODULATORS OF THE DOPAMINE TRANSPORTER WITH POTENTIAL VALUE IN THE TREATMENT OF SUBSTANCE ABUSE DISORDERS

(71) Applicant: University of Kentucky Research Foundation, Lexington, KY (US)

(72) Inventors: John M. Littleton, Lexington, KY (US); Bert Lynn, Lexington, KY (US); Dennis T. Rogers, Lexington, KY (US); Greg Gerhardt, Lexington, KY (US)

( * ) Notice: Subject to any disclaimer, the term of this patent is extended or adjusted under 35 U.S.C. 154(b) by 906 days.

(21) Appl. No.: 17/779,678

(22) PCT Filed: Nov. 25, 2020

(86) PCT No.: PCT/US2020/062431
§ 371 (c)(1),
(2) Date: May 25, 2022

(87) PCT Pub. No.: WO2021/108720
PCT Pub. Date: Jun. 3, 2021

(65) Prior Publication Data
US 2022/0401437 A1    Dec. 22, 2022

Related U.S. Application Data

(60) Provisional application No. 62/939,908, filed on Nov. 25, 2019.

(51) Int. Cl.
*A61K 31/4709*    (2006.01)
*A61K 31/4725*    (2006.01)
*A61P 25/32*    (2006.01)
*A61P 25/34*    (2006.01)

(52) U.S. Cl.
CPC .......... *A61K 31/4725* (2013.01); *A61P 25/32* (2018.01); *A61P 25/34* (2018.01)

(58) Field of Classification Search
CPC ................................................. A61K 31/4709
See application file for complete search history.

(56) References Cited

U.S. PATENT DOCUMENTS

2016/0040176 A1    2/2016   Littleton et al.

OTHER PUBLICATIONS

Mfuh et al, Heterocyclic Noxides—an emerging class of therapeutic agents, 2015, Curr Med Chem, vol. 22, No. 24, p. 2819-2857. (Year: 2015).*
Brown et al., "Novel multifunctional pharmacology of Iobinaline, the major alkaloid from Lobelia cardinalis", Fitoterapla, 111: p. 109-123, Jun. 2016.
Kelley et al., "Microfluidic capillary zone electrophoresis mass spectrometry analysis of alkaloids in Lobelia cardinalis transgenic and mutant plant cell cultures", Epublication date: Oct. 4, 2019.

* cited by examiner

*Primary Examiner* — Adam C Milligan
*Assistant Examiner* — Karen Cheng
(74) *Attorney, Agent, or Firm* — Stites & Harbison PLLC; Mandy Wilson Decker

(57) ABSTRACT

The presently-disclosed subject matter describes Lobinaline N-oxides as modulators of the dopamine transporter. The presently-disclosed subject matter further describes to Lobinaline N-oxides as modulators of the nicotinic acetylcholine receptors. Also described herein are methods for treating substance abuse disorders comprising administering Lobinaline N-oxides to a subject in need thereof.

19 Claims, 12 Drawing Sheets

Chemical Formula: $C_{29}H_{38}N_2O_2$
Exact Mass: 446.2933

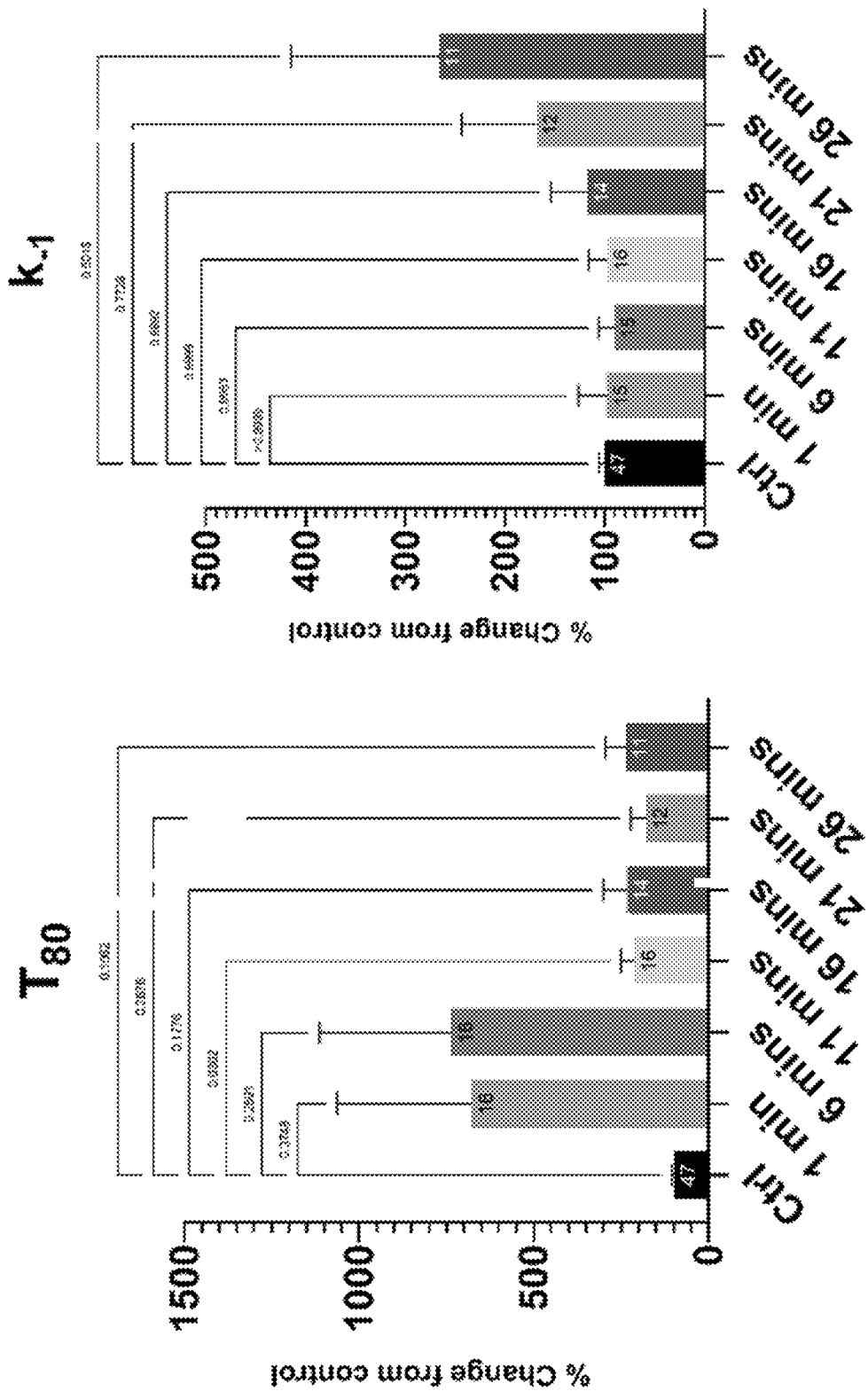
FIG. 12, CON'T

LOBINALINE N-OXIDES AS POSITIVE ALLOSTERIC MODULATORS OF THE DOPAMINE TRANSPORTER WITH POTENTIAL VALUE IN THE TREATMENT OF SUBSTANCE ABUSE DISORDERS

RELATED APPLICATIONS

This application is a national stage application, filed under 35 U.S.C. § 371, of International Patent Application No. PCT/US2020/062431, filed Nov. 25, 2020, which claims priority from U.S. Provisional Patent Application No. 62/939,908, filed Nov. 25, 2019 the entire disclosures of which are incorporated herein by this reference.

GOVERNMENT INTEREST

This invention was made with government support under grant number 1R44AA025804 awarded by the National Institutes of Health. The government has certain rights in the invention.

TECHNICAL FIELD

The present invention relates to Lobinaline N-oxides as modulators of the dopamine transporter and modulators of the nicotinic acetylcholine receptors and methods using the same.

BACKGROUND

Substance use disorders (SUDs) are arguably the most important medical problem facing the US in the 21st century [9]. Although opioids, methamphetamine and cocaine receive most media attention it is nicotine and alcohol use disorders that cause the most serious pathology, and have the greatest societal and medical cost [1]. The significance of these SUDs is exacerbated by the lack of effective treatments, Thus although naltrexone and acamprosate are FDA-approved for alcohol use disorder, and varenicline and bupropion are approved for smoking cessation, new and more effective pharmacotherapies are urgently needed, particularly for the common situation in which alcohol and tobacco/nicotine use disorder co-exist [2]. Given the morbidity associated with these conditions, it is extremely important to seek treatments that are effective for both disorders whether separate or combined [2].

Release of dopamine (DA) from the mesolimbic dopaminergic pathway is involved in the positively reinforcing effects of all drugs that are abused [10]. The dopamine transporter (DAT) regulates synaptic DA concentrations and adaptations in DAT function are implicated in negative reinforcement also [11]. The DAT is therefore a molecular target for all substance use disorders, including both alcohol and nicotine use disorders [12]. However, it is a challenging target, and a massive synthetic drug discovery effort has yielded very few DAT inhibitors without abuse liability themselves. An exception is the "atypical" DAT inhibitor modafinil that has been reported by University colleagues to reduce both alcohol and nicotine self-administration in a rat model, but was ineffective when alcohol and nicotine were combined [13]. Another exception is bupropion (FDA-approved for nicotine use disorder) which is effective in reducing both smoking in alcoholics [14] and alcohol consumption in animal models [3]. Bupropion is a synthetic derivative of the plant natural product cathinone [15] showing that plants can be a source of DAT inhibitors with clinical value in these SUDs.

the rewarding effects of nicotine are caused by agonist effects on neuronal nicotinic acetylcholine receptors (nicAChRs) in the dopaminergic mesolimbic pathway [16]. Conversely, negatively reinforcing effects may be caused by neuroadaptation and/or densensitization of nicAChRs [17]. This makes the nicAChR a difficult molecular target in nicotine use disorder because inhibition of nicAChR function is required to reduce positive reinforcement for nicotine use, whereas activation of nicAChR function is required to substitute for nicotine during withdrawal. The solution (as for buprenorphine in opioid use disorder) has been to seek nicAChR partial agonists that will both reduce the acute agonist effects of nicotine and substitute for nicotine in withdrawal. The plant alkaloid cytisine is a known nicAChR partial agonist [18], and this structure was used by Pfizer to synthesize varenicline, now regarded as the most effective smoking cessation agent approved by the FDA [19]. The situation for alcohol use disorder is much more complex, and there are many potential molecular targets. However, alcohol enhances the effects of acetylcholine on most nicAChR subtypes, and this is believed to play a role in the positively reinforcing effects of alcohol [20]. Partial agonists at nicAChRs are therefore potential therapies for alcohol use disorder as well as nicotine use disorder and alcohol/nicotine co-use disorder [2]. This is supported by the positive effects of varenicline in human experiments and clinical trials [21,4]. NicAChRs are therefore valid molecular targets for nicotine and/or alcohol use disorder, and drugs that are partial agonists at nicAChR are likely to be the most effective therapeutic agents in both.

Many of the bioactive metabolites in plants have evolved for defense against herbivorous insects [7]. Metabolites such as cocaine and cathinone target the insect DAT and, since DA signals satiety in the insect, these act as "anti-feedants" [22]. Homology between the proteins in the insect and human makes these plants a source of abused or therapeutic inhibitors of the human DAT. Similarly, plants have evolved "defensive" nicAChR ligands because nicAChRs are the major excitatory mechanism in the insect brain. Insects that feed on leaves rich in nicAChR ligands are incapacitated and cease feeding [23]. Homology between nicAChR proteins in the insect and human, means that nicotine causes nicotine use disorder whereas natural partial agonists like cytisine are leads for treatment of nicotine use disorder. Plants sometimes combine activities at nicAChRs and the DAT in a single molecule because natural selection favors metabolites with multiple survival-related mechanisms [7]. Such compounds therefore have a multifunctional pharmacology that is optimal for plant defense and for treating alcohol and nicotine use disorders.

*Lobelia inflata* contains the simple alkaloid, lobeline, that is a nicAChR weak partial agonist and that inhibits dopamine transporters [24]. The combination of activities prompted testing of lobeline in a mouse model of alcohol binge drinking where it dose-dependently reduced alcohol consumption [25]. This supports this combination of actions (mimicking bupropion and varenicline) as of potential value in both alcohol and nicotine use disorders. However, *L. inflata* is known as "Indian tobacco", because it was used by Native Americans as a substitute for tobacco, and this precludes protection of IP for this use (hence Pfizer's focus on cytisine as the scaffold for varenicline). The applicants therefore searched for novel plant metabolites with activity on nicAChRs and the DAT by screening an extract library of 1000 native plant species [26]. This identified nicAChR binding activity in extracts from another *Lobelia* species *Lobelia cardinalis*, which contains the more complex alkaloid, lobinaline [27]. This alkaloid also has inhibitory effects on the DAT (with higher potency than lobeline, modafinil and bupropion), and acts as a partial agonist at nicAChRs [5]. Lobinaline is a clear lead compound for treating alcohol and nicotine use disorders, but it is a complex binitrogenous alkaloid, with 5 chiral centers [27] making it unsuitable for lead optimization by conventional chemical synthesis of derivatives. However, Naprogenix' novel proprietary biotechnology "target-directed evolution" should redirect biosynthesis in mutant *L. cardinalis* cells toward lobinaline derivatives that may be more active or more druggable than the parent [see 8].

This provides an alternative source of novel compounds to combinatorial chemistry by using mutant plant cells to generate metabolites with activity at specific therapeutic target proteins. In this technology, the target protein is expressed in plant cells in such a way that the desired interaction of plant metabolites with this protein is linked to cell survival in a specific selection procedure. Plant cells that overproduce known or novel metabolites with the desired activity on the target then have a survival advantage when this selection procedure is imposed on a mutant population (FIG. 1). This technology therefore "evolves" biosynthesis in plant cells toward metabolites with the desired activity on the target protein. To seek novel active lobinaline derivatives root cells of *L. cardinalis* were transformed to express the human DAT protein and selected mutants in 1-methyl-4-phenylpyridinium (MPP+), a neurotoxin that is accumulated intracellularly by activity of the DAT [8]. This favors survival of mutants that are overproducing metabolites with inhibitory activity on the human DAT because these are protected from MPP+ accumulation. 25% of the surviving mutants contained increased DAT inhibitory activity not caused by lobinaline alone. Analysis of these mutant clones identified lobinaline N-oxides with novel modulatory activity on the DAT.

Lobinaline had not previously been investigated for these activities, and its structure (see below) is unlike any known DAT inhibitor or nicAChR ligand. The lobinaline N-oxides have not been previously reported in any plant species, and were discovered by a novel micro-analytical method in mutant plant cells after conventional methods failed to identify them. The modulatory activity of the lobinaline N-oxides on the DAT is unlike any other known DAT inhibitor, and they are the first potential commercial products to provide proof of application for this unique biotech approach to finding optimized leads in transgenic mutant plant cells.

SUMMARY

The presently-disclosed subject matter meets some or all of the above-identified needs, as will become evident to those of ordinary skill in the art after a study of information provided in this document.

This Summary describes several embodiments of the presently-disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature (s) mentioned; likewise, those features can be applied to other embodiments of the presently-disclosed subject matter, whether listed in this Summary or not. To avoid excessive repetition, this Summary does not list or suggest all possible combinations of such features.

One embodiment of the present invention is a method for treating a substance use disorder in a subject, comprising: administering a pharmaceutically effective amount of a lobinaline N-oxide to a subject diagnosed with a substance use disorder. In a further embodiment of the present invention, the substance abuse disorder is alcohol abuse or nicotine abuse. In some embodiments the pharmaceutically effective amount is about 25 mg/kg. In some embodiments, the lobinaline N-oxide is lobinaline mono-N-oxide. In some embodiments, the lobinaline N-oxide is lobinaline bi-N-oxide. In a further embodiment, the administration is subcutaneous.

Another embodiment of the present invention relates to a method for modulating a dopamine transporter in a cell, comprising: administering to the cell an effective amount of a lobinaline N-oxide. In a further embodiment of the present invention, the effective amount is between about 300 nM and about 3 µM. In some embodiments, the lobinaline N-oxide is lobinaline mono-N-oxide. In other embodiments, the lobinaline N-oxide is lobinaline bi-N-oxide. In some embodiments, the cell is in a subject. In further embodiments, when the cell is in a subject, the effective amount is 25 mg/kg. In some embodiments, the administration is subcutaneous.

One embodiment of the present invention relates to a method of modulating a nicotinic acetylcholine receptor in a cell, comprising: administering to the cell an effective amount of a lobinaline N-oxide. In some embodiments of the present invention, the effective amount is about 100 µM to about 500 µM. In some embodiments, the lobinaline N-oxide is lobinaline mono-N-oxide. In other embodiments, the lobinaline N-oxide is lobinaline bi-N-oxide. In other embodiments, the cell is in a subject. In further embodiments, when the cell is in a subject, the effective amount is 25 mg/kg. In some embodiments, the administration is subcutaneous.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed

BRIEF DESCRIPTION OF THE DRAWINGS

The presently-disclosed subject matter will be better understood, and features, aspects and advantages other than those set forth above will become apparent when consideration is given to the following detailed description thereof. Such detailed description makes reference to the following drawings, wherein.

Figure 1:
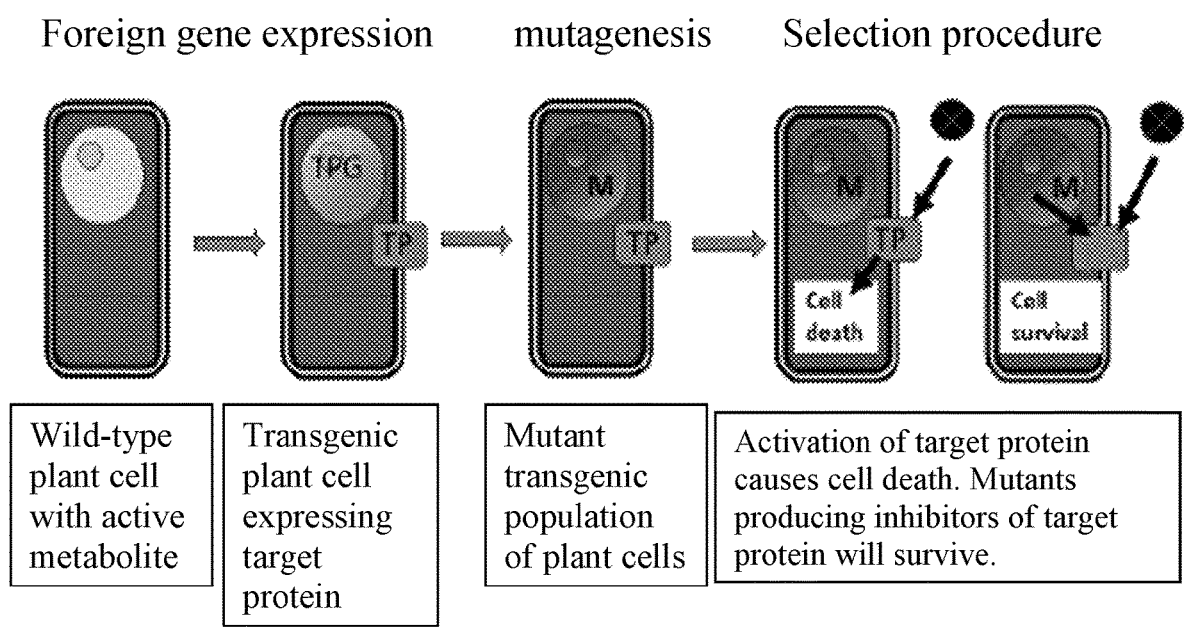
FIG. 1 shows a diagram of target directed biosynthesis in plant cells.
Figure 2:
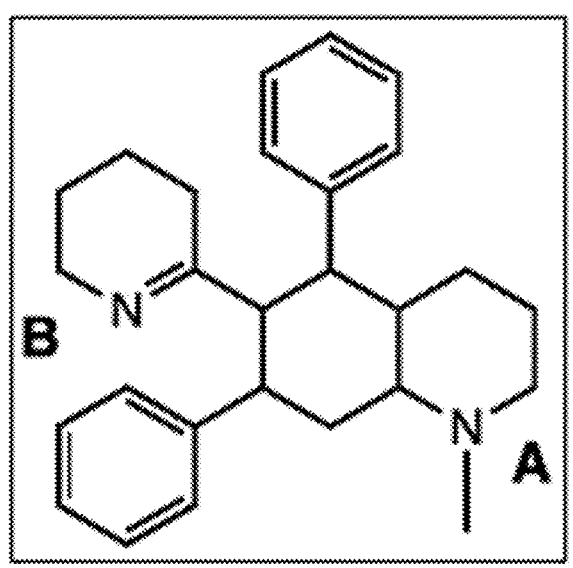
FIG. 2 shows the structure of lobinaline.

While the disclosure is susceptible to various modifications and alternative forms, specific embodiments thereof have been shown by way of example in the drawings and are herein described below in detail. It should be understood, however, that the description of specific embodiments is not intended to limit the disclosure to cover all modifications, equivalents and alternatives falling within the spirit and scope of the disclosure as defined by the appended claims.

DESCRIPTION OF EXEMPLARY EMBODIMENTS

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

While the terms used herein are believed to be well understood by those of ordinary skill in the art, certain definitions are set forth to facilitate explanation of the presently-disclosed subject matter.

Unless defined otherwise, all technical and scientific terms used herein have the same meaning as is commonly understood by one of skill in the art to which the invention(s) belong.

All patents, patent applications, published applications and publications, GenBank sequences, databases, websites and other published materials referred to throughout the entire disclosure herein, unless noted otherwise, are incorporated by reference in their entirety.

Where reference is made to a URL or other such identifier or address, it understood that such identifiers can change and particular information on the internet can come and go, but equivalent information can be found by searching the internet. Reference thereto evidences the availability and public dissemination of such information.

As used herein, the abbreviations for any protective groups, amino acids and other compounds, are, unless indicated otherwise, in accord with their common usage, recognized abbreviations, or the IUPAC-IUB Commission on Biochemical Nomenclature (see, Biochem. (1972) 11(9): 1726-1732).

Although any methods, devices, and materials similar or equivalent to those described herein can be used in the practice or testing of the presently-disclosed subject matter, representative methods, devices, and materials are described herein.

Following long-standing patent law convention, the terms "a", "an", and "the" refer to "one or more" when used in this application, including the claims. Thus, for example, reference to "a biomarker" includes a plurality of such biomarkers, and so forth.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, width, length, height, concentration or percentage is meant to encompass variations of in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, "optional" or "optionally" means that the subsequently described event or circumstance does or does not occur and that the description includes instances where said event or circumstance occurs and instances where it does not. For example, an optionally variant portion means that the portion is variant or non-variant.

As used herein, the term "treatment" refers to the medical management of a patient with the intent to cure, ameliorate, stabilize, or prevent a disease, pathological condition, or disorder. This term includes active treatment, that is, treatment directed specifically toward the improvement of a disease, pathological condition, or disorder, and also includes causal treatment, that is, treatment directed toward removal of the cause of the associated disease, pathological condition, or disorder. In addition, this term includes palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder.

As used herein, the term "prevent" or "preventing" refers to precluding, averting, obviating, forestalling, stopping, or hindering something from happening, especially by advance action. It is understood that where reduce, inhibit or prevent are used herein, unless specifically indicated otherwise, the use of the other two words is also expressly disclosed.

As used herein, the term "diagnosed" means having been subjected to a physical examination by a person of skill, for example, a physician, and found to have a condition that can be diagnosed or treated by the compounds, compositions, or methods disclosed herein. For example, "diagnosed with a substance abuse disorder means having been subjected to a physical examination by a person of skill, for example, a physician, and found to have a condition that can be diagnosed or treated by a compound or composition that can favorably modulate DAT or nicAchR. Such a diagnosis can be in reference to a disorder, such as alcoholism, and the like, as discussed herein.

As used herein, the term "subject" refers to a target of administration. The subject of the herein disclosed methods can be a mammal. Thus, the subject of the herein disclosed methods can be a human, non-human primate, horse, pig, rabbit, dog, sheep, goat, cow, cat, guinea pig or rodent. The term does not denote a particular age or sex. Thus, adult and newborn subjects, as well as fetuses, whether male or female, are intended to be covered. A "patient" refers to a subject afflicted with a disease or disorder. The term "patient" includes human and veterinary subjects.

As used herein, the terms "administering" and "administration" refer to any method of providing a pharmaceutical preparation to a subject. Such methods are well known to those skilled in the art and include, but are not limited to, oral administration, transdermal administration, administration by inhalation, nasal administration, topical administration, intravaginal administration, ophthalmic administration, intraaural administration, intracerebral administration, rectal administration, and parenteral administration, including injectable such as intravenous administration, intra-arterial administration, intramuscular administration, and subcutaneous administration. Administration can be continuous or intermittent. In various aspects, a preparation can be administered therapeutically; that is, administered to treat an existing disease or condition. In further various aspects, a preparation can be administered prophylactically; that is, administered for prevention of a disease or condition.

The term "effective amount" refers to an amount that is sufficient to achieve the desired result or to have an effect on an undesired condition. For example, a "therapeutically effective amount" refers to an amount that is sufficient to achieve the desired therapeutic result or to have an effect on undesired symptoms, but is generally insufficient to cause adverse side effects. The specific therapeutically effective dose level if or any particular patient will depend upon a variety of factors including the disorder being treated and the severity of the disorder; the specific composition employed; the age, bodyweight, general health, sex and diet of the patient; the time of administration; the route of administration; the rate of excretion of the specific compound employed; the duration of the treatment; drugs used in combination or coincidental with the specific compound employed and like factors well known in the medical arts. For example, it is well within the skill of the art to start doses of a compound at levels lower than those required to achieve the desired therapeutic effect and to gradually increase the dosage until the desired effect is achieved. If desired, the effective daily dose can be divided into multiple doses for purposes of administration. Consequently, single dose compositions can contain such amounts or submultiples thereof to make up the daily dose. The dosage can be adjusted by the individual physician in the event of any contraindications. Dosage can vary, and can be administered in one or more dose administrations daily, for one or several days. Guidance can be found in the literature for appropriate dosages for given classes of pharmaceutical products.

In some aspects of the disclosed methods, the subject has been diagnosed with a need for treatment of a substance use disorder. In some aspects of the disclosed method, the subject has been diagnosed with a need for treatment of alcohol or nicotine use disorder. The disclosed methods can further comprise a step of identifying a subject having a need for treatment of a disclosed disorder.

As used herein the term "modulator" or "modulating" refer to a compound that has activity when bound to a target molecule. A modulator can increase or decrease the target molecule activity. The site bound by the modulator may be the traditional active site of the target, or a site at a distance from the active site of the target. For example, a modulator of a the dopamine transporter may decrease or increase the amount of dopamine transported by the transporter. A modulator of a receptor such as the nicotinic acetyl choline receptor may act as an agonist, antagonist, mixed agonist, partial agonist, inverse agonist, or any combination thereof depending on the assay used to measure activity. Modulating target activity is a term well understood in the art.

As used therein the term "a lobinaline N-oxide" or "lobinaline N-oxides" refers to both lobinaline mono-N-oxides (also referred to as "lobinaline N-oxide" or lobinox herein) where a single N on lobinaline is bound to oxygen and lobinaline bi-N-oxide where both N of lobinaline are oxygen bound.

As used herein, the term "pharmaceutically acceptable carrier" refers to sterile aqueous or nonaqueous solutions, dispersions, suspensions or emulsions, as well as sterile powders for reconstitution into sterile injectable solutions or dispersions just prior to use. Examples of suitable aqueous and nonaqueous carriers, diluents, solvents or vehicles include water, ethanol, polyols (such as glycerol, propylene glycol, polyethylene glycol and the like), carboxymethylcellulose and suitable mixtures thereof, vegetable oils (such as olive oil) and injectable organic esters such as ethyl oleate. Proper fluidity can be maintained, for example, by the use of coating materials such as lecithin, by the maintenance of the required particle size in the case of dispersions and by the use of surfactants. These compositions can also contain adjuvants such as preservatives, wetting agents, emulsifying agents and dispersing agents. Prevention of the action of microorganisms can be ensured by the inclusion of various antibacterial and antifungal agents such as paraben, chlorobutanol, phenol, sorbic acid and the like. It can also be desirable to include isotonic agents such as sugars, sodium chloride and the like. Prolonged absorption of the injectable pharmaceutical form can be brought about by the inclusion of agents, such as aluminum monostearate and gelatin, which delay absorption. Injectable depot forms are made by forming microencapsule matrices of the drug in biodegradable polymers such as polylactide-polyglycolide, poly(orthoesters) and poly(anhydrides). Depending upon the ratio of drug to polymer and the nature of the particular polymer employed, the rate of drug release can be controlled. Depot injectable formulations are also prepared by entrapping the drug in liposomes or microemulsions which are compatible with body tissues. The injectable formulations can be sterilized, for example, by filtration through a bacterial-retaining filter or by incorporating sterilizing agents in the form of sterile solid compositions which can be dissolved or dispersed in sterile water or other sterile injectable media just prior to use. Suitable inert carriers can include sugars such as lactose. Desirably, at least 95% by weight of the particles of the active ingredient have an effective particle size in the range of 0.01 to 10 micrometers.

EXAMPLES

Several methods for preparing the compounds of this invention are illustrated in the following Examples. Starting materials and the requisite intermediates are in some cases commercially available, or can be prepared according to literature procedures or as illustrated herein.

Example 1: Pharmacology of the Lead Compound.

Lobinaline (FIG. 1), was isolated from plant material and identified as the first-known binitrogenous plant alkaloid more than 80 years ago [27]. The applicants began to test its pharmacological activity after identifying Lobelia cardinalis as a novel source of nicAChR activity by high throughput screening in 2005 [26]. This plant species has no history of abuse, or traditional medicinal use of relevance to SUDs. Present studies [see 5 and below] showed that lobinaline is a weak non-subtype selective partial agonist at nicAChRs with a profile similar to varenicline, and is a relatively potent inhibitor of the DAT. These actions support lobinaline as a lead compound for the treatment of SUDs, particularly alcohol and nicotine use disorders. Lobinaline did not violate any of the druggable criteria in Lipinski's "Rule of Five" [28]: molecular weight=386, hydrogen bond donors=0, hydrogen bond acceptors=2, cLogP=4.8, molar fractivity=82.47. Lobinaline also appears to have appropriate pharmacokinetics and low toxicity [29]. However, its very low aqueous solubility, and structural complexity (5 chiral centers), make lobinaline problematic as a conventional lead. Conversely, this makes it a good test of the ability of target-directed evolution to generate novel inhibitors of the DAT in mutant plant cells.

Example 2: Target-Directed Evolution of L. cardinalis.

Expression of the human (h)DAT in cultures of L cardinalis made the transgenic (hDAT) plant cells highly susceptible to the neurotoxin MPP+, which is accumulated intracellularly by the hDAT [8]. Inhibitors of the hDAT (including lobinaline) "rescued" transgenic (hDAT) plant cells from this toxin [8], establishing a selection procedure (exposure to MPP+) in which metabolites with the desired inhibitory activity on the target protein (the hDAT) confer a survival advantage. Activation tagging mutagenesis (ATM) was then used to generate mutant secondary hairy roots from a stable transgenic (hDAT) line. ATM introduces viral enhancer sequences into the genome, randomly activating one or two genes in the vicinity of the insertion. ATM was performed in an MPP+ concentration in which only 1/300 transgenic (hDAT) mutants developed. Selection was maintained for 4 months to ensure that the resistant phenotype was stable. This yielded 108 MPP+-resistant transgenic (hDAT) mutants, which were maintained on toxin-free medium for 2 months before analysis. The prediction was that many MPP+-resistant mutants would be overproducing DAT inhibitory metabolites.

Example 3: Pharmacological and Chemical Analysis of MPP+-Resistant Mutants.

Figure 3:
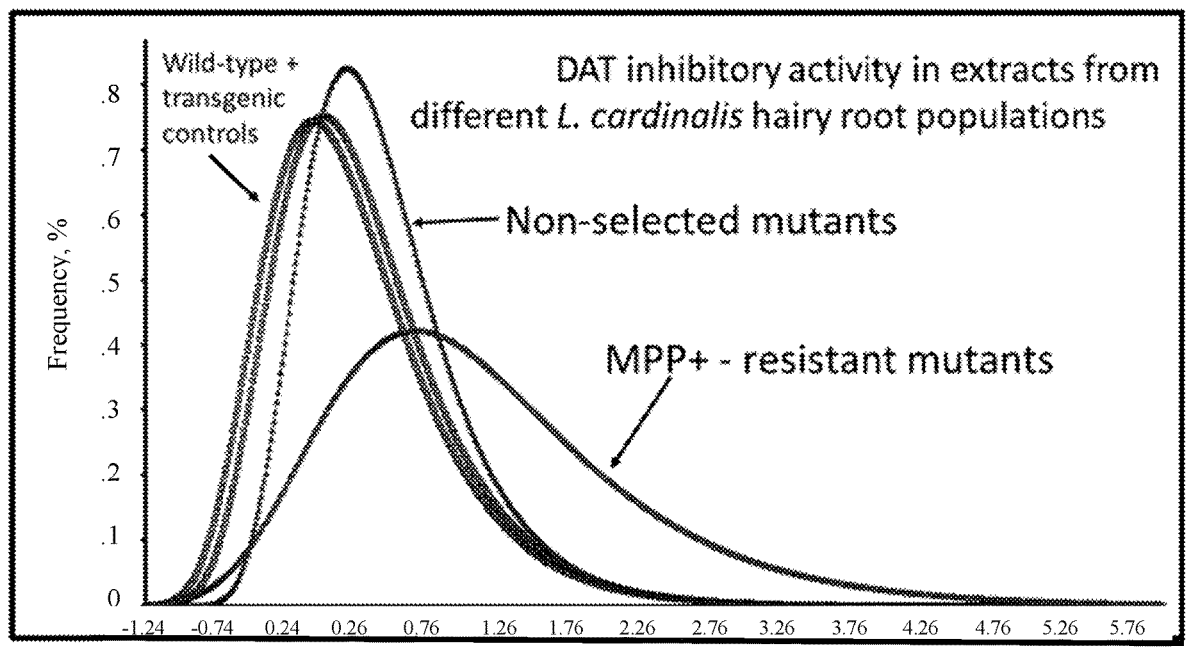
FIG. 3 shows DAT inhibitory activity in extracts from different *L. cardinalis* hairy root populations.
Figure 4:
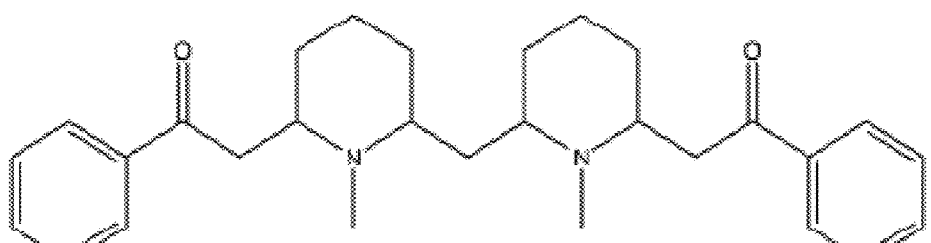
FIG. 4 shows the structure of a dimer of allosedamine.

Extracts were compared with controls for their inhibition of rat synaptosomal DAT [30]. FIG. 3 shows the $\log_{10}$ distribution of DAT inhibitory activity in the different populations. 58 of the 108 MPP+ resistant mutants showed DAT inhibitory activity greater than 2SD above the control means [8]. This suggests that MPP+-resistance of these 58 mutants is at least partly a result of overproduction of DAT inhibitory metabolites. Extracts from this sub-population were then analyzed by GC/MS for lobinaline content. In 16 of these clones the increase in DAT inhibition is attributable to an increase in lobinaline, and in another 15 there are increases in other metabolites that are similar to known inhibitors of the DAT [see 8]. This leaves 27 MPP+-resistant mutant clones in which the plant metabolites responsible for increased inhibitory activity on the DAT are unknown. Novel micro-analytical methods were developed for these cultures based on uHPLC followed by zone capillary electrophoresis MS analysis using the 908 devices ZipChip interface with data processing by Mz/mine 2. The MS data from 10 mutants containing unexplained DAT inhibitory activity were then used to prioritize 15 metabolites based on overabundance and frequency in this population. 5 of these showed structures similar to previously known active compounds, and the remaining 10 were complex alkaloids. A peak with mz 403 (priority #9) was analyzed because the accurate mass indicated this to be lobinaline with an additional Oxygen, making identification relatively easy. NMR and tandem MS identified this as an N-oxide of lobinaline, and this was separated for further analysis (see below). Several of the remaining alkaloids are very likely to be active, for example priority #3 is a binitrogenous analog of lobeline, that has never been reported in any plant species previously, nor tested for pharmacological activity before. This is a dimer of allo-sedamine (FIG. 4). Sedamine dimerizes differently in the biosynthesis of lobinaline [31] so that in the 5 clones containing this alkaloid a mutation has probably altered the pathway to this novel product.

Example 4: Stability of Transgenic Mutant Plant Cell Cultures:

after 5 years, the transgenic (hDAT) clones continue to show increased [3H]DA uptake and remain sensitive to MPP+-toxicity. Thus the hDAT transgene continues to be expressed. Similarly MPP+-resistant mutants retain resistance upon re-exposure to MPP+, indicating that the ATM mutations are stable. Next generation RNA sequencing of MPP+-resistant mutants indicated over-expression of genes that regulate alkaloid biosynthesis, microtubule assembly and responses to oxidative stress, all relevant to continued MPP+-resistance. Mutants that overproduced DAT inhibitory activity and/or that had overproduced lobinaline continued to do so. The genotype and phenotype stability suggests that these cultures remain valuable for plant drug discovery.

Example 5: Pharmacology of Lobinaline and the Lobinaline N-Oxides in vitro:

Lobinaline and the "mono"-N-oxide were separated from plant and culture material by acid/base extraction, but the bi-N-oxide was derived from lobinaline using 3-chloroperbenzoic acid. All these compounds were separated by column chromatography with identity and purity confirmed by LC/MS. N-oxidation commonly increases the aqueous solubility of alkaloids [32] and the lobinaline N-oxide from mutant cultures was much more soluble than lobinaline (K octanol/water 1.29+19 vs lobinaline Ko/w 4.8) making it more readily "druggable" [28].

Figure 5:
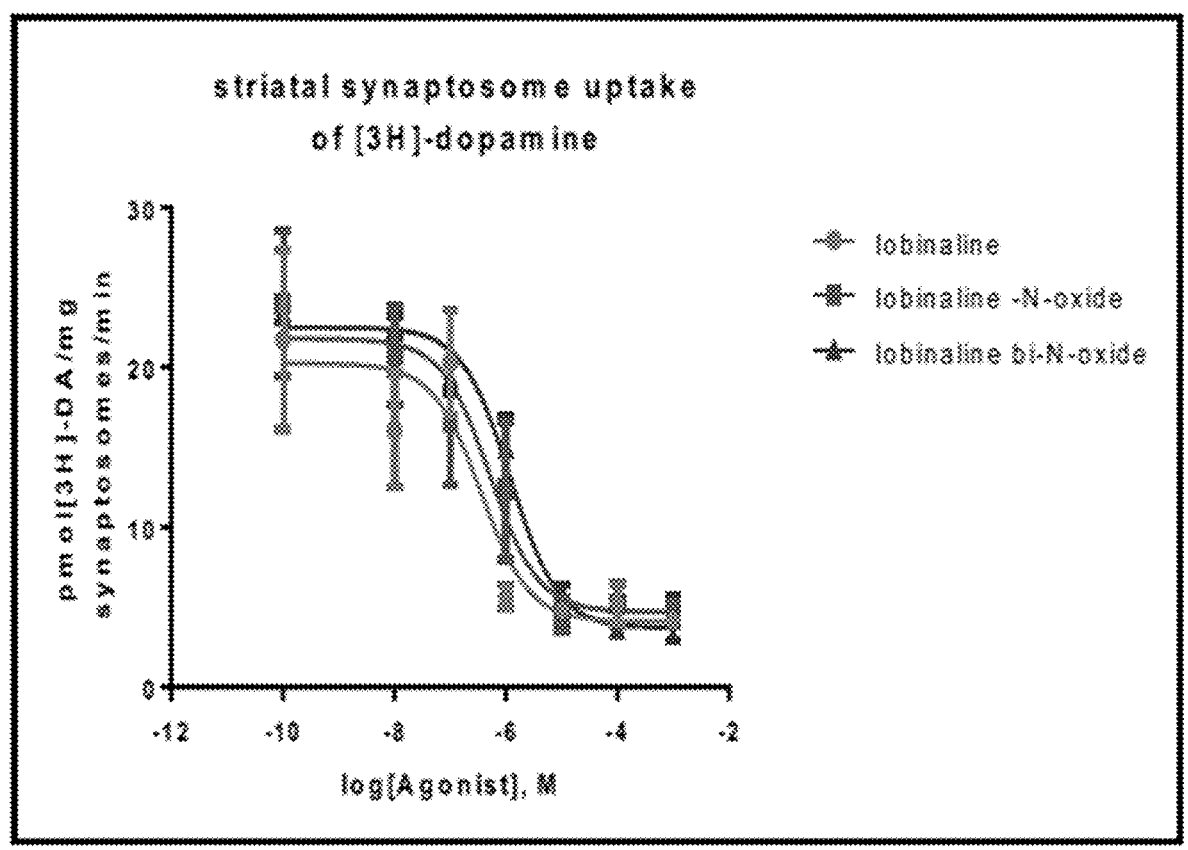
FIG. 5 shows the striatal synaptosome uptake of [3H]-dopamine.

Example 6: [3H]DA Uptake into Rat Striatal Synaptosomes [5]:

Lobinaline and the corresponding N-oxide and bi-N-oxide all inhibited [3H]-DA uptake into rat striatal synaptosomes (FIG. 5). Lobinaline or the N-oxides were added 15 min before addition of [3H]DA. Synaptosomal uptake of [3H]DA was measured after 30 min incubation at 37° C. The lobinaline $IC_{50}$ is 359 nM, lobinaline-N-oxide $IC_{50}$ is 517 nM and the lobinaline bi-N-oxide $IC_{50}$ is 1.19 µM. The $IC_{50}$ for modafinil under similar conditions is 4 uM [33] and for bupropion is 1.9 uM [34]. Lobinaline and its N-oxide are therefore relatively potent compared to these other atypical DAT inhibitors.

[3H]GBR 12935 binding to rat striatal homogenate [5]: Lobinaline completely displaced the DAT ligand [3H]GBR 12935 with a Ki of 2.54 uM, whereas the N-oxides partially displaced the radioligand with a similar Ki. GBR 12909 completely displaced the radioligand with a Ki of 20 nM. All these displacement curves were monophasic, whereas that for cocaine is biphasic. Lobinaline and its N-oxides bind to this site on the DAT protein, but with relatively low affinity. [3H]DA release from rat striatal synaptosomes: Synaptosomes preloaded with [3H]DA were exposed to lobinaline (10-500 uM), 30 min @ 37° C.). [3H]DA release was calculated by subtraction of activity following drug treatment from activity in the absence of drug. Lobinaline caused significant release of [3H]DA only at 500 uM suggesting that it does not have amphetamine-like effects on DA release at therapeutic concentrations. The data on DA uptake and release in vitro indicate that lobinaline and its N-oxides are relatively potent inhibitors of the DAT, and do not have effects similar to psychostimulants (i.e. they may be "atypical").

Example 7: Displacement of Radioligand Binding from nicAChRs [5]:

Lobinaline and its bi-N-oxide monophasically displaced the high-affinity nicAChR ligand [3H]epibatidine from rat brain homogenates (lobinaline Ki 16 µM, lobinaline-bi-N-oxide Ki 6.5 uM). Lobinaline N-oxide displaced [3H]epibatidine more weakly with a multiphasic displacement curve. Lobinaline displaced the beta2-selective radioligand [3H]cytisine with a Ki 1.1 uM and displaced [3H]-methyllycaconitine (alpha7-nicAChR selective) with a Ki of 15 µM. The data indicates low affinity binding to nicAChRs, with some selectivity for the alpha4/beta2 nicAChR subtype. This contrasts with the high affinity of varenicline and lobeline [35], and suggests an allosteric effect on nicAChR function (see below).

Effects of lobinaline and nicotine on $^{45}Ca^{2+}$ entry into SHSY5Y cells [5]: nicAChR function can be evaluated semi-quantitatively in this cell line by measuring $^{45}Ca^{2+}$ entry in response to nicotine. A semi-pure lobinaline fraction at a concentration of ~25 uM caused significant $^{45}Ca^{2+}$ entry that was completely inhibited by the nicAChR antagonist mecamylamine at 1 uM. However, this lobinaline fraction at the same concentration significantly inhibited (~50%) the $^{45}Ca^{2+}$ entry caused by 10 uM nicotine. The conclusion is that lobinaline acts as a weak partial agonist at nicAChRs. The lobinaline N-oxides have not yet been tested in this system.

Effects of lobinaline and nicotine on [3H]DA release from superfused rat striatal slices (ref 5): rat brain striatal slices were incubated with [3H]DA for 30 min at 340 C before transfer to superfusion chambers. Semi-pure lobinaline @ 100 uM-500 uM caused significant concentration-dependent increases in fractional [3H] release compared to vehicle. To evaluate the role of nicAChRs, striatal slices preloaded with [3H]-DA were pretreated with the nicAChR antagonist mecamylamine (10 µM) prior to superfusion of lobinaline (100 µM). This significantly attenuated lobinaline-evoked fractional [3H] release indicating that the alkaloid is a weak nicAChR agonist. However, when superfusion of lobinaline @100 uM preceded superfusion of 10 uM nicotine, the fractional [3H]DA release induced by nicotine was completely prevented. With the data above from SHSY5Y cells, this supports a partial agonist action of lobinaline at nicAChRs. The N-oxides have not yet been tested in this system. Lobinaline has weak agonist effects on nicAChRs, but also has as yet unquantified antagonist effects (i.e. it acts as a partial agonist at nicAChRs).

Figure 6:
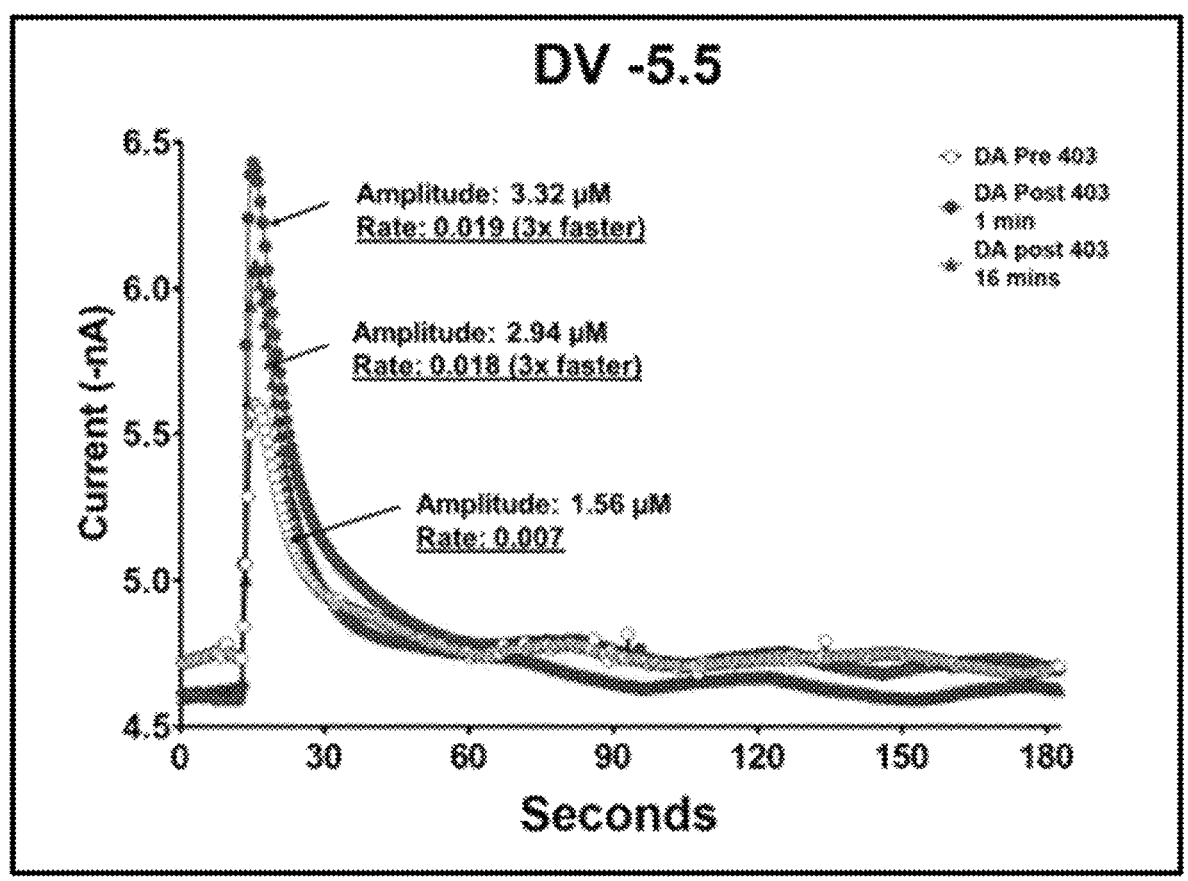
FIG. 6 shows lobinaline N-oxide produces a twofold increase in amplitude of the DA signal consistent with c50% acute inhibition of the DAT.

Example 8: Pharmacology of the Lobinaline N-Oxides on the DAT in vivo:

DA clearance in striatum and nucleus accumbens of urethane-anesthetized SD rats was monitored by in vivo electrochemistry using high-speed chrono-amperometry [see 36]. After obtaining reproducible signals for locally applied DA, vehicle or drug was applied slowly over 10-30 sec, then 30-60 sec later the next application of DA was made, with subsequent DA applications at 5-minute intervals for 25-30 min. The DA kinetic data from each animal was analyzed using FAST software (Quanteon). This defines two clearance parameters: 1) the 80% decay time from peak response, and 2) the clearance rate, the first order rate of decay of the DA signal multiplied times the peak amplitude. When lobinaline was tested in this system [5] it non-significantly decreased the DA peak and also significantly decreased the clearance rate 1-minute post-application. These effects were no longer seen 3-5 minutes after lobinaline ejection. They are consistent with simple competitive inhibition of the DAT by lobinaline. All other DAT inhibitors tested have produced similar inhibitory effects or do not alter DA clearance rate. However, the lobinaline N-oxides produce different effects. Representative data from lobinaline N-oxide, at the same concentration used for lobinaline (1 mM in 250 nl medium) are shown in FIG. 6. Unlike lobinaline, the lobinaline N-oxide caused a twofold increase in amplitude of the DA signal, consistent with c50% acute inhibition of the DAT. This is entirely consistent with effects on synaptosomal [3H]DA uptake in vitro above, and probably represents competitive inhibition. However, after exposure to the N-oxide there is a significant and prolonged (c20 min) increase in the first order rate of decay of the DA peak. In the study shown, at a dorso-ventral (DV) position of −5.5 mm, the increase in rate constant is about three-fold, and remains at this level even after 16 minutes (when DA peak amplitude has declined). This increase in rate constant induced by the N-oxide varied from 20× to 2× at increasing depths in the DV gradient. The bi-N-oxide was also tested, and had similar though less dramatic effects (not shown).

Figure 8:
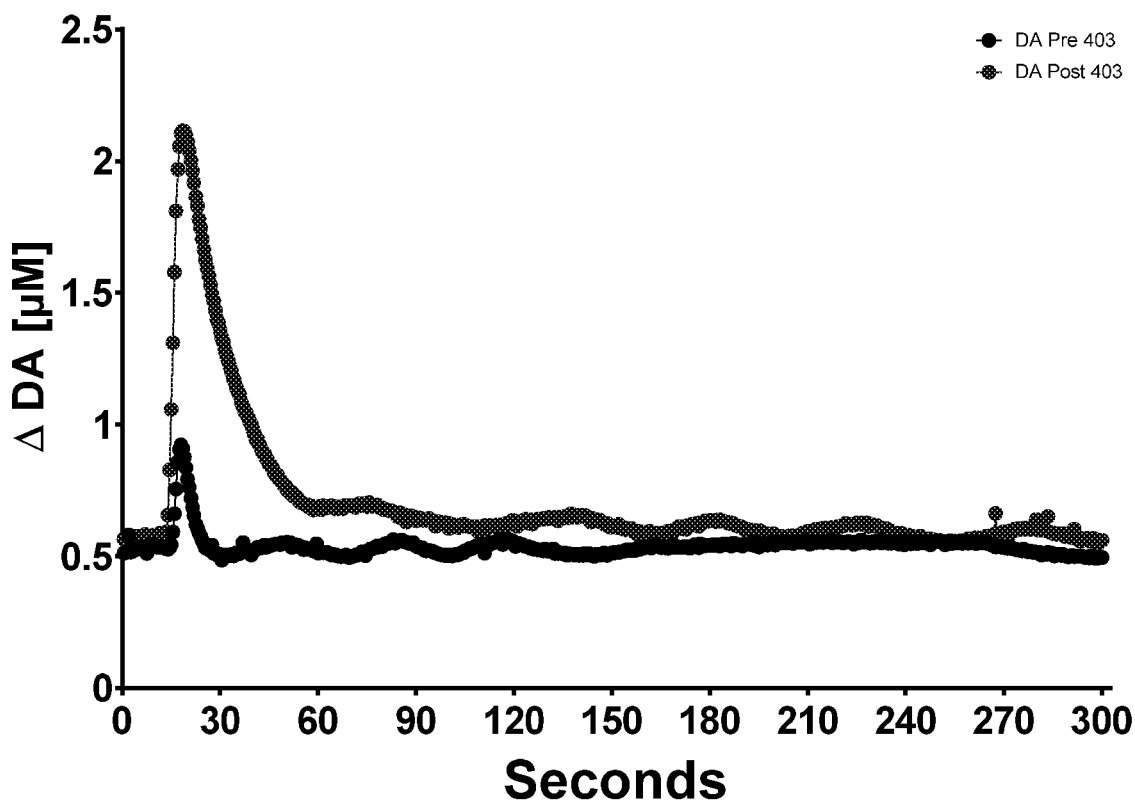
FIG. 8 shows the local effect of exogenously applied lobinaline N-oxide (403) on DA uptake shows a reduction of 60% in DA clearance with a doubling in amplitude in the rat striatum (DA was ejected at arrow).
Figure 9:
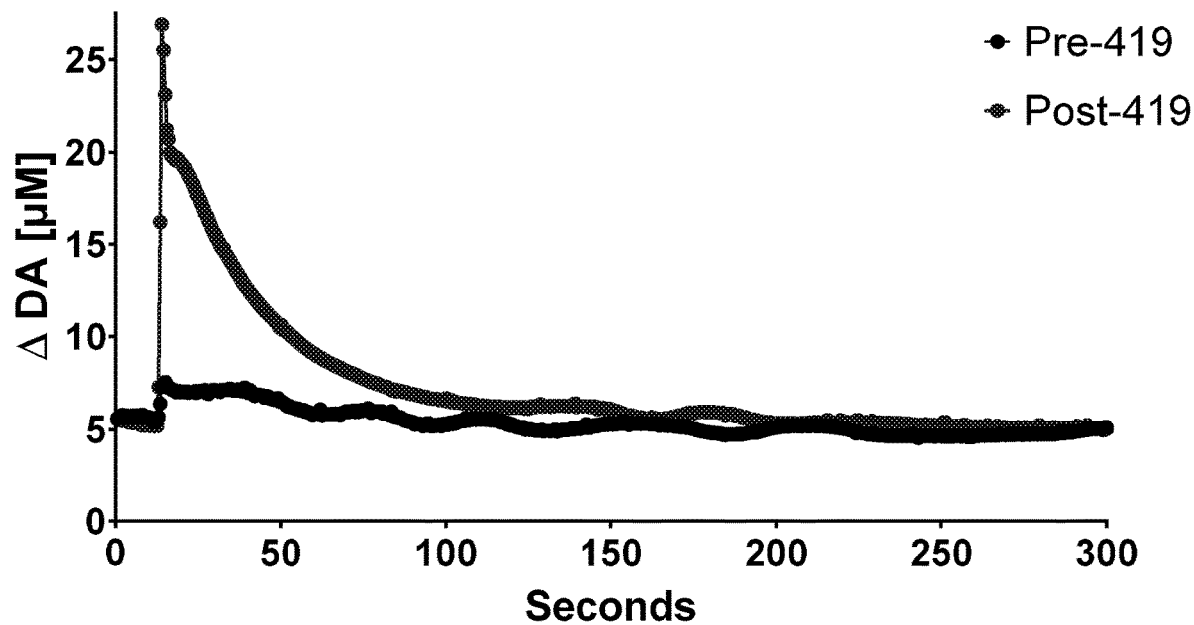
FIG. 9 shows the local effect of exogenously applied lobinaline bi-N-oxide (419) on DA uptake shows a reduction of 40% in DA clearance with 4 fold increase in amplitude in the striatum (DA was ejected at arrow).

To examine the effects of lobinaline and 2 of its N-oxide derivative (labelled 403 and 419) on DA clearance, high-speed chronoamperometric recordings were used to measure the clearance properties of exogenously applied DA in the striatum of anesthetized animals. The uptake rate of locally applied DA (~100 nl; 200 µM) was measured before and 1 minute after local application of lobinaline (~250 nl; 1 mM), 403 (~300 nl; 250 µM) or 419 (~300 nl; 250 µM) (FIGS. 7, 8, and 9).

Lobinaline, 403 and 419 are not electroactive and have no direct effect on baseline recordings of DA.

Figure 7:
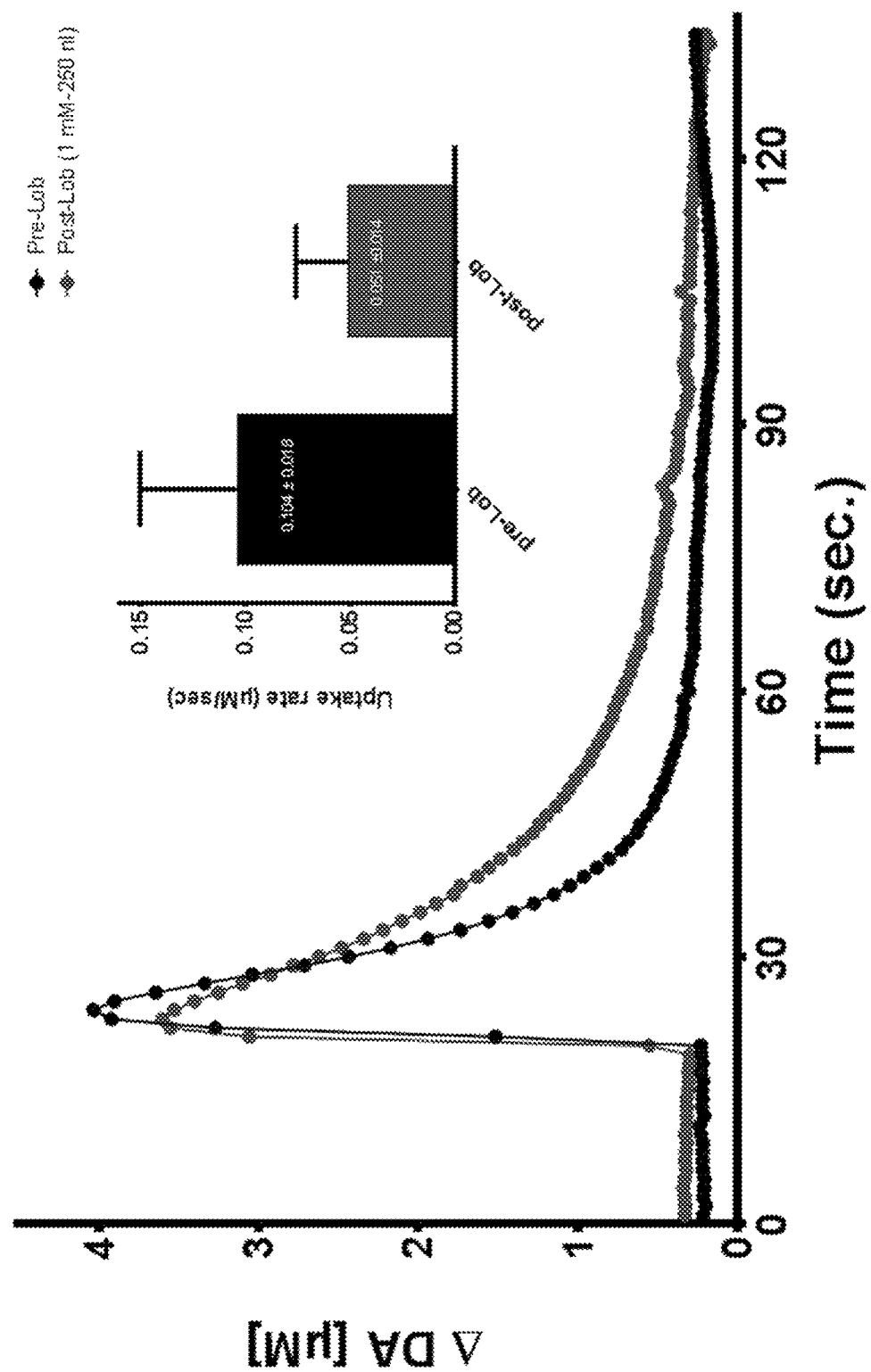
FIG. 7 shows the local effect of exogenously applied lobinaline on DA uptake show a reduction of 50% in DA clearance in the striatum (DA was ejected at arrow).

For lobinaline a 50% decrease in DA clearance 1 minute after lobinaline ejection was observed (FIG. 7). The effects of lobinaline on DA clearance are short acting as DA clearance returns to normal 3 to 5 minutes after the lobinaline ejection. The effects of 403 and 419 differ from lobinaline as they modulate amplitude and duration of DA signals (FIGS. 8 and 9). Furthermore their effects are longer lasting (>20 mins)

These effects of lobinaline N-oxides were observed in repeated experiments, with repeated measurements of DA clearance at different positions in the DV gradient. The prolonged increase in DA uptake capacity caused by the lobinaline N-oxides cannot be explained by competitive inhibition, and appears to be unique for a DAT modulator (based on a Pubmed survey). The interpretation is that the lobinaline N-oxides compete with DA for uptake by the DAT, (thereby increasing the DA peak) but, once inside the nerve terminal, they increase the function of the DAT (causing an increased capacity for clearance of DA). This could be by direct effects on the DAT protein via an internal binding site, or by altering DAT regulation, for example via protein phosphorylation [37]. The increased capacity for DA uptake would not have been observed in the synaptosomal studies in vitro, although it may have reduced the apparent inhibitory potency of the lobinaline N-oxides. These modulatory effects of lobinaline N-oxides on DA uptake and clearance are highly significant for their potential value in SUDs.

Example 9: Lobinaline N-Oxides as Potential Pharmacotherapy for SUDs.

The dual modulatory effects of lobinaline N-oxides on the DAT are analogous to partial agonist effects on receptor proteins and, similar to partial agonists, the combination of negative and positive effects should produce little reinforcement or aversion (see below). However, when the lobinaline N-oxides are present with a drug of abuse they should (a) initially compete with drugs like amphetamines for uptake into the nerve terminal, and then (b) via the increase in DA uptake capacity they should oppose the increased synaptic DA caused by all abused drugs [10]. This should inhibit positively reinforcing effects of abused drugs without precipitating withdrawal. In addition to this therapeutically valuable novel mechanism, the aqueous solubility of the N-oxides makes them druggable, and heterocyclic N-oxides generally have good therapeutic characteristics [see 38].

Example 10: Behavioral Studies.

these studies used semi-synthetic lobinaline bi-N-oxide, rather than the more active lobinaline N-oxide. Even this strategy produced enough lobinaline bi-N-oxide for only minimal behavioral studies at single doses and time points. For intact animal studies it is important that many alkaloids are metabolized to N-oxides by hepatic cytochrome P450, so that it is possible that lobinaline N-oxides may contribute to behavioral effects of lobinaline

Example 11: Abuse Potential:

In conditioned place preference a chamber with distinct cues is repeatedly paired with administration of the test drug. A second chamber is repeatedly paired with a control injection. After conditioning, a test phase allows the rat to move between the chambers. If a drug is "rewarding" (i.e. has abuse potential), the rat spends more time in the drug-associated chamber. If it is aversive, the opposite result is obtained.

Methods: 6 male and 6 female SD rats were used for each drug and dose. Test drugs (5 or 25 mg/kg lobinaline, or 25 mg/Kg of lobinaline bi-N-oxide S.C) were paired with the "less preferred" compartment (standard for drugs that may be weakly reinforcing) for 20 minutes. On the next day, rats received a control (DMSO/saline) injection and were placed in the preferred chamber. After three repeated pairings (test and control), the subjects were given access to both chambers and the time spent in each compartment was recorded and scored by an observer blind to treatment. Analysis was by two way ANOVA with post hoc Bonnferoni with significance set at $p<0.05$. Results. Most animals spent most of the test period in the compartment originally preferred in the drug-free state, and there were no significant differences between drug and vehicle controls. Thus neither lobinaline nor the lobinaline bi-N-oxide produced conditioned place preference or aversion. There was no sedation or locomotor activation in the drug-treated animals, and no signs of overt toxicity, even after 3 repeated drug administrations.

Example 12: Effects on Alcohol Consumption:

"Drinking in the dark" is a model for binge drinking in which C57Bl/6J mice are given limited access to alcohol during their dark cycle. With repeated daily access, mice will voluntarily drink to blood alcohol levels above 150 mg/dl. Lobeline reduces alcohol consumption in this model [25] and it has predictive validity in that both naltrexone and acamprosate are active [39,40].

Methods: 8 male and 8 female mice were used for each of these studies and scoring was by an observer blind to treatment. Statistical analysis was by ANOVA followed by Bonnferoni posthoc with significance at $p<0.05$.

Results: Lobinaline produced a dose-dependent inhibition of alcohol consumption that was marked (~40% inhibition) and significant at 25 mg/Kg SC in both males and females. The lobinaline bi-N-oxide produced similar inhibition to lobinaline at 25 mg/Kg SC (significant @ $p<0.05$). In the lobinaline bi-N-oxide study, but not in the lobinaline study, the vehicle injection also inhibited alcohol consumption. The effects of lobinaline and the bi-N-oxide are comparable to those of acamprosate and naltrexone in this screen. There was no significant difference between males and females, no reduction in food or water intake, and neither compound produced overt toxicity.

Example 13: Effects on Nicotine-Induced Locomotor Activation (LMA):

low S.C. doses of nicotine, repeated daily, cause progressive LMA related to mesolimbic DA release [41]. This is reduced by lobeline and varenicline [42,43] and therefore has predictive value as a screen for potential therapeutics in nicotine use disorder.

Methods: 2 groups of 6 adult SD rats of each sex were tested in an open-field apparatus for LMA. Each animal received a daily nicotine injection (0.5 mg/Kg SC) for 6 days with the last nicotine injection preceded (20 min) by 25 mg/Kg SC of lobinaline bi-N-oxide. Behavior was recorded and scored by an observer blind to treatment. Data was presented as line crosses/5 minutes with LMA over days 1-5 compared to LMA on day 6.

Results: Nicotine-induced LMA showed a progressive linear increase over days 1-5 (i.e. sensitization occurred). This trend was reversed in both sexes by the injection of lobinaline bi-N-oxide before nicotine on day 6, with mean nicotine-induced LMA lower than on day 5. Experimental design (dictated by availability of test material) precludes parametric analysis, but the same trend was observed in repeated measures in 10/12 individual animals.

Conclusion: Neither lobinaline nor the bi-N-oxide produced any sign of toxicity or abuse potential. Lobinaline and the bi-N-oxide produced positive effects in the alcohol use disorder screen and the bi-N-oxide was positive in the nicotine screen. These screens must be repeated in more animals, using a range of doses and including the more active mono-N-oxide. Overall the pharmacological analyses in vitro and in vivo and the preliminary behavioral studies support the value of lobinaline, and its N-oxides, as therapeutics in SUDs.

Example 14: Extraction and Separation of Lobinaline from *L. cardinalis*.

Dried *L. cardinalis* plant material is crushed and soaked in methanol for 3 Days. Hairy root cultures are excised and stored at −4° C. before being lyophilized, ground and transferred to amber glass vials with phthalate-free caps before shaking for 24 h in 5 mL of methanol per 100 mg of powdered root as for dried plant tissue. Plant material is then filtered out and the methanol extract transferred to glass Erlenmeyer flasks. This extraction procedure is repeated 3 times before all the methanol fractions are completely dried by rotatory evaporator and stored at 4° C. When required this extract is mixed with water and extracted with chloroform 200 ml (four times) before solvent removal in the rotatory evaporator, and lobinaline is separated by acid base extraction and column chromatography, with purity established by LC MS.

Example 15: Chemical Modification of Lobinaline to N-Oxides., lobinaline and its mono-N-oxide were extracted and purified from plant material (intact plant or mutant cultures).

Lobinaline was then oxidized with m-chloroperoxybenzoic acid with the original intent to produce mono-N-oxides [57]. However, lobinaline is a binitrogenous alkaloid and it proved difficult to stop the reaction at the mono-N-oxide stage. The aim was modified and the bi-N-oxide of lobinaline was produced. This was an unsatisfactory solution because when tested for effects on the DAT in vivo the semi-synthetic bi-N-oxide was less potent than the "natural" mono-N-oxide. It is likely that N-oxidation in this natural N-oxide is on the saturated N-methyl N-heterocycle rather than the unsaturated N-heterocycle.

Example 16: Tandem Data Featuring Preparative HPLC for Identification of Lobinaline N-Oxide:

Products of the extraction and separation are purified using a Phenomenex Luna preparative c18 column (10 μm, 100×10 mm) and a 50/50 isocratic method with 0.01% formic acid and 0.01% formic acid in MeOH. Fractions are infused directly into the Q Exactive to confirm identity. Subsequent tandem experiments are performed for structural elucidation of m/z 403 as the N-oxide of lobinaline. At an NCE set to 45, both ions (m/z 387.2795 and m/z 403.2750) fragment to several ions of the exact same m/z ratio. Product ions for m/z 403 first display the loss of the oxygen of the N-oxide bond and are then consistent with the products of the lobinaline fragmentation.

Example 17: Identification of DAT Modulators in Mutant *L. cardinalis* cultures.

9 prioritized metabolites remain in mutant cultures that are complex alkaloids with structures that suggest pharmacological activity. This aim is to separate or synthesize some of these, beginning with the binitrogenous lobeline analog (priority #3), to test them for potential value as leads for novel DAT modulators. (a) Preparation of individual hairy root cultures for analysis: Dried extracts of hairy roots are reconstituted in MeOH to 1 mg/mL and 250 μL aliquots diluted in 200 μL of optima H2O and acidified with 50 mM HCl to pH 2 before extraction with 500 μL CHCl3 and the organic layer removed. The aqueous layer is basified to pH 10 with 100 mM NH4OH and extracted again with 500 μL of CHCl3 before being reduced to dryness under N2. (b) UHPLC and ZipChip analysis: The Lynn Group uses multiple analytical methods to identify and quantify secondary plant metabolites. The primary method employs uHPLC chromatographic separation coupled with a high-resolution, accurate-mass (HRAM) orbitrap mass spectrometer. Full scan data can provide empirical formulae and tandem mass spectrometry can provide structures. These approaches identified the mono-N-oxide (m/z 403) and bi-N-oxide (m/z 419) of lobinaline in mutant plant cultures. Additionally, a chip based microfluidic separation has been developed specifically for plant cell culture extracts that greatly reduces analysis time [59]. (c) MZmine processing of data from hairy root cultures: RAW data files are converted to mzML files using the open source MSConvert software. ZipChip electropherograms are de-convoluted and de-isotoped. Alignment uses the RANSAC tool with tolerances consistent with previous processes, lists are then gap-filled for peaks with a 10% intensity tolerance and again with the m/z and RT range gap filler. UHPLC data is processed using the same workflow but time ranges are adjusted to accommodate longer peak widths and retention times.

Example 18:

Dopaminergic transmission in the nucleus accumbens plays a major role in positively reinforcing effects of drugs, and neuroadaptation in this system is a mechanism for negative reinforcement [Koob & Volkow, 2010]. This makes the dopamine transporter (DAT) a major molecular therapeutic target in substance use disorders (SUDs) [Zhu & Reith, 2008]. Most synthetic DAT inhibitors have abuse liability themselves, but DAT inhibitors that have evolved in plants for insect defense [see Pichersky & Gang, 2000] do not necessarily have this liability. For example, *Lobelia cardinalis*, a plant species with no history of abuse, contains lobinaline, a novel DAT inhibitor [Brown et al 2016] that does not support conditioned place preference [Preliminary studies]. Lobinaline is a potential lead for SUDs, but it is a complex bi-nitrogenous insoluble alkaloid, with no total chemical synthesis. Target-directed evolution, based on mutagenesis and selection of plant cells expressing the human DAT, was therefore used to seek novel biosynthetic leads with modulatory activity on the DAT [Brown et al 2016]. Microchemical analytical methods prioritized 15 up-regulated candidate molecules in selected mutant clones, with four of these being derivatives of lobinaline not previously detected in non-mutants. Two of these are more soluble N-oxides of lobinaline and, when tested in vivo by microperfusion into rat brain, these have a unique biphasic modulatory action in which inhibition of rate of DA uptake leading to an increase in DA peak concentration, is followed by increased capacity for DA clearance. This complex modulatory activity is unlike lobinaline, or any previously known DAT inhibitor. It is analogous to partial agonist activity, and this strongly suggests therapeutic value in SUDs.

Example 19 Pharmacology of the Lobinaline N-Oxides on the DAT in vivo:

The effects of lobinaline or lobinaline N-oxide on dopamine uptake in the striatum of isoflurane-anesthetized SD rats were monitored by in vivo electrochemistry using high-speed chrono-amperometry [see 17,18]. After obtaining reproducible signals for locally applied DA (50-75 nl, 200 µM) to produce a control DA peak height below 1 uM, vehicle or drug was locally applied slowly over 10-30 sec (~500 nl 250 µM), then 60 sec later the next application of DA was performed, with subsequent DA applications at 5-min intervals for 25 min. Lobinaline, and the lobinaline N-oxides are not electroactive and so do not interfere with the DA signals. The DA kinetic data from each animal were analyzed using FAST software (Quanteon, LLC, Nicholasville KY USA). This analysis defines maximum peak height and three clearance parameters: 1) $T_{80}$, the 80% decay time from the peak response; 2) the first-order rate of decay of the DA signal ($k_{-1}$); and 3) the clearance rate, the maximum peak height multiplied by $k_{-1}$. These parameters were compared between pre- and post-drug application by one-way ANOVA with Tukey's post hoc analysis, with significance assigned at $p<0.05$.

Figure 10:
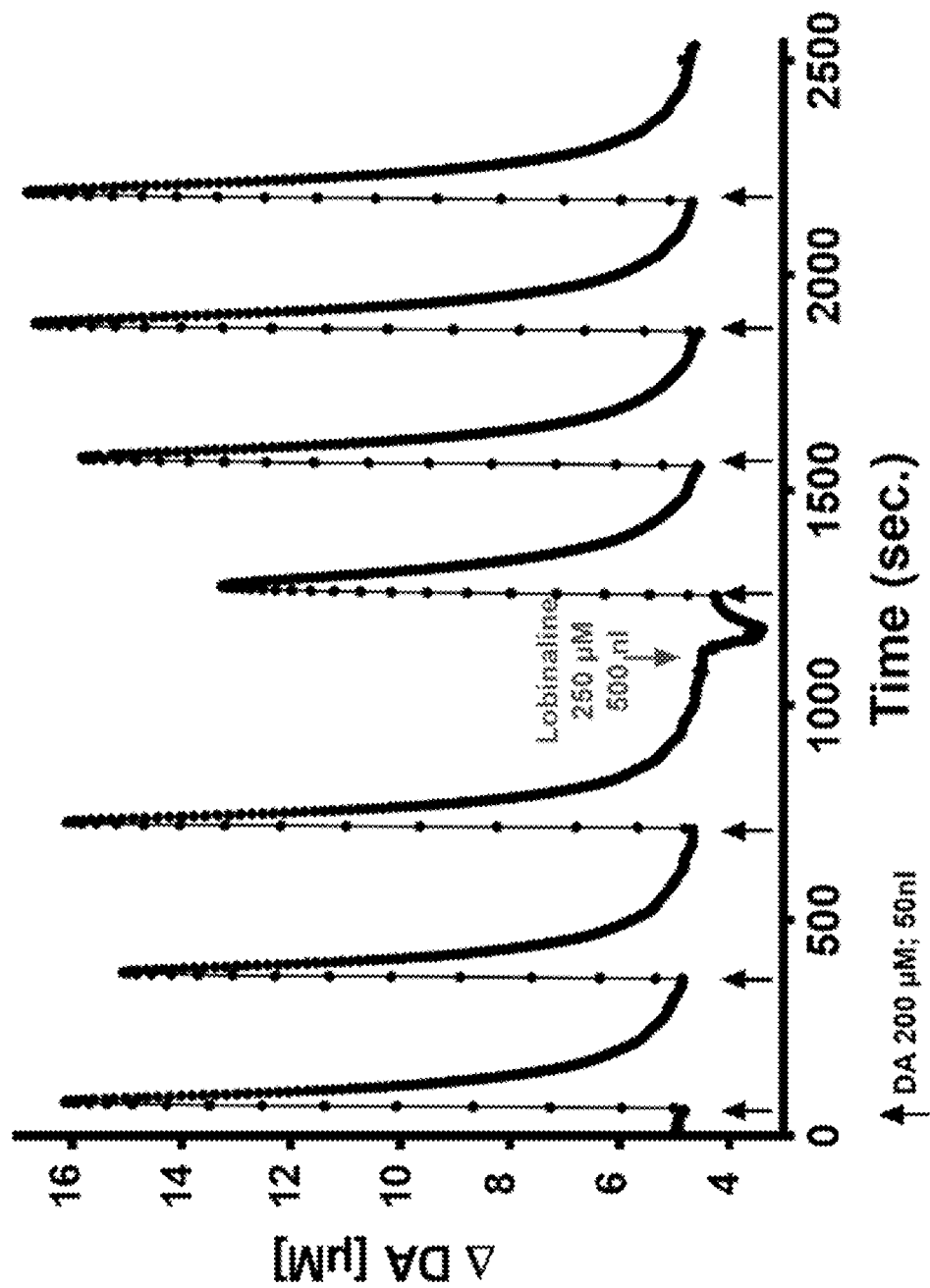
FIG. 10 shows the electrochemical signal showing the effects of lobinaline and on local pressure ejection of dopamine (DA 250 µM; 50-75 nl) in the striatum repeated every 5 mins.
Figure 11:
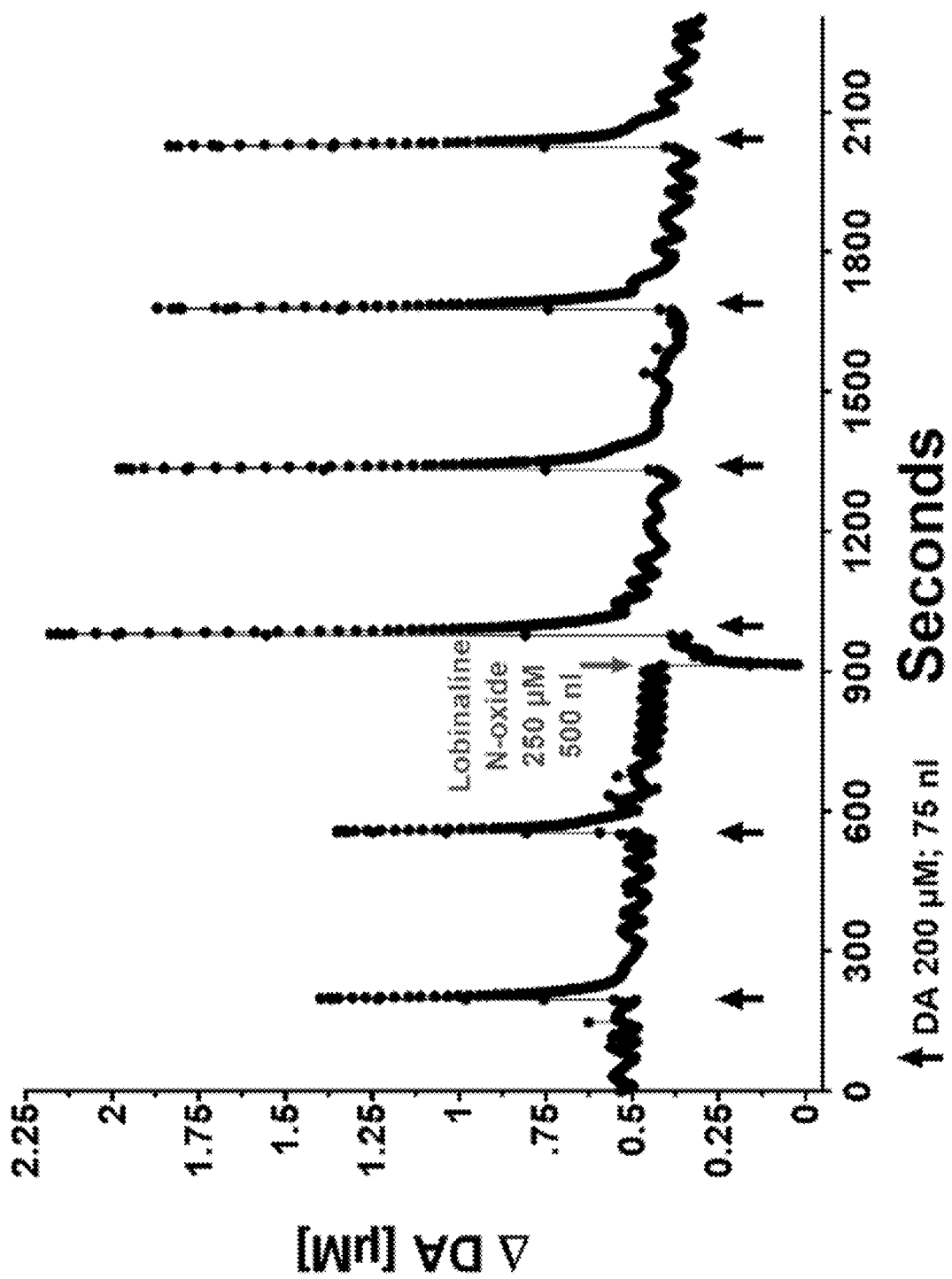
FIG. 11 shows the electrochemical signal showing the effects of lobinaline N-oxide on local pressure ejection of dopamine (DA 250 µM; 50-75 nl) in the anesthetized rat striatum repeated every 5 mins.

Example 20: The Effects of Lobinaline and Lobinaline N-Oxide on Dopamine Signals in Vivo Neither lobinaline nor its N-oxides ever caused release of endogenous DA in any brain region in this system (n=8-36) Representative data from local applications of dopamine, lobinaline, and lobinaline N-oxide are shown in FIGS. 10 and 11. These figures show the effects of a single local application of the test agents on the phasic changes in extracellular dopamine concentration produced by repeated local application of dopamine into the rat striatum as measured by chrono-amperometry. The effects of Lobinaline are transient, a non-significant decrease in amplitude of the DA signal, whereas Lobinaline N-Oxide produces an increase in amplitude that is maintained for at least 20 minutes over four local applications of dopamine.

In addition to this major difference in effects on DA peak amplitude there were also differences between Lobinaline and this Lobinaline N-oxide in their effects on DA clearance after the peak. Lobinaline caused a small, but significant, reduction in all DA clearance parameters (relative to % control) consistent with inhibitory effects on the DAT. However, in contrast lobinaline-N-oxide caused complex changes in which DA clearance parameters were reduced immediately after microinjection but increased later, even when DA peak amplitude was still increased over control (see FIGS. 12 and 13).

Figure 12:
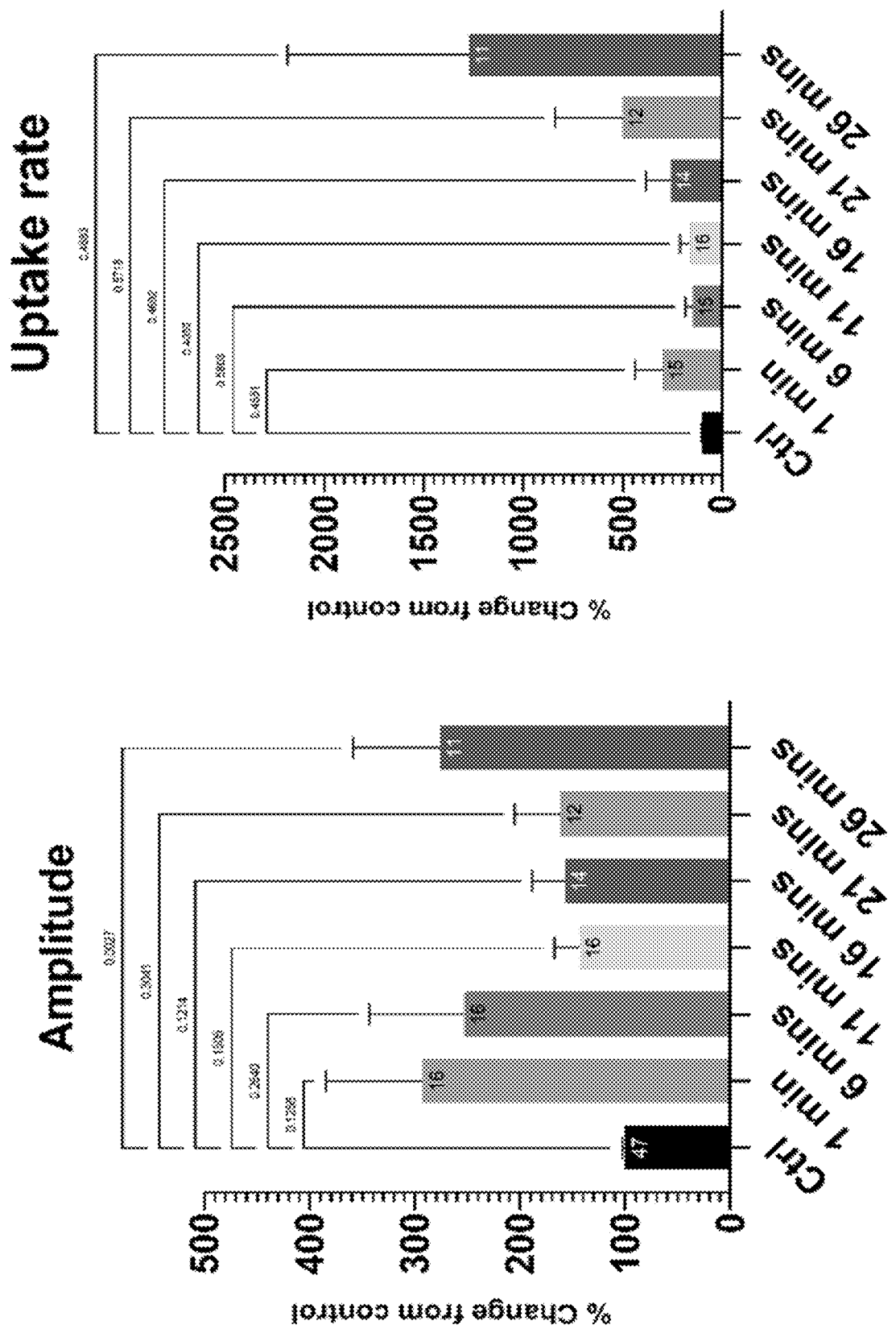
FIG. 12 shows the effect of exogenously microinjected lobinaline N-oxide "Lobinox" on DA signal parameters obtained after microinjection of DA into the dorsal striatum.

In FIG. 12 the effects of lobinaline N-oxide on DA signals in the dorsal striatum (DV-3.5 to DV-5.5 mm) are shown with changes expressed as % control DA signal parameters. There is a marked and prolonged (but variable) increase in the peak amplitude throughout the experiment (i.e. up to 26 minutes after micro-injection of lobinaline N-oxide). As regards the clearance parameters the early changes are an increase in $T_{80}$ and clearance rate that reflects the increase in peak amplitude, with no change in $k_{-1}$. However later, after 11-26 minutes there is an increase in both uptake rate and $k_{-1}$ with little change in $T_{80}$. These effects suggest an increase in rate of DA clearance after the peak and are not consistent with a simple inhibition of the DAT throughout the 26 minute duration of the experiment.

Figure 13:
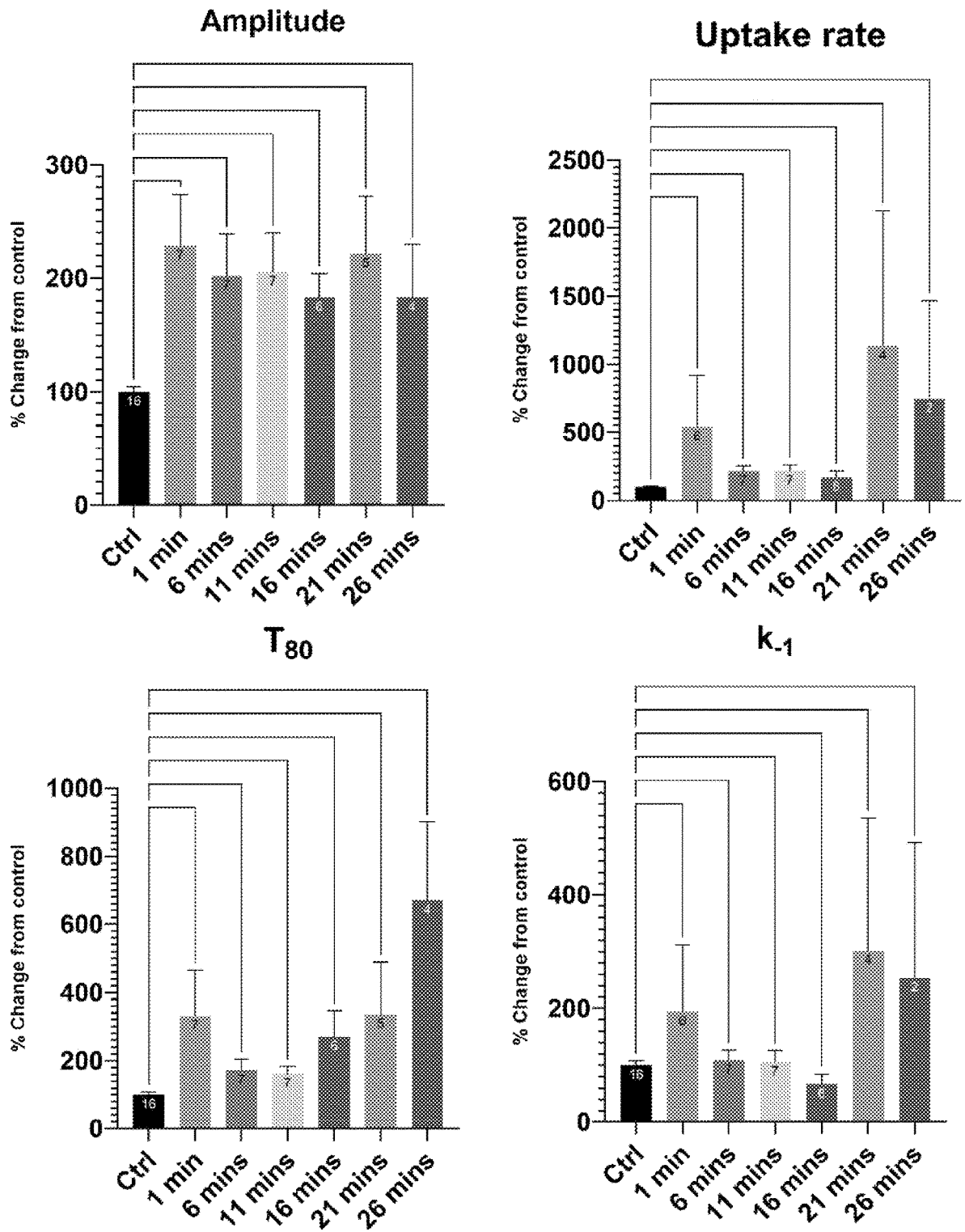
FIG. 13 shows the effect of exogenously microinjected lobinaline N-oxide "Lobinox" on DA signal parameters obtained after microinjection of DA into the ventral striatum.

In FIG. 13 the effects of lobinaline N-oxide on DA signals in the ventral striatum (DV-6 to −7.5 mm) are shown with changes expressed as % control DA signal parameters. This depth in the DV gradient represents the shell of the nucleus accumbens. As regards the effect of lobinaline N-oxide there is a marked and consistent increase in DA peak amplitude throughout the experiment (i.e. up to 26 minutes after a single microinjection of lobinaline N-oxide. The effect of lobinaline N-oxide are variable but again show an increase in clearance rate and $k_{-1}$ at 21 and 26 minutes. Once again these data are not consistent with a simple inhibition of the DAT throughout the duration of the experiment.

To summarize in vivo pharmacology, the lobinaline N-oxides produced different effects on repeated DA signals from those caused by lobinaline when locally micro-injected into the rat brain. Thus lobinaline produced a small and transient reduction in DA peak height following a single microinjection. However, lobinaline-N-oxide caused a significant and prolonged increase in dopamine peak height following the same procedure. Particularly in the ventral striatum this effect of a single micro-injection of lobinaline N-oxide was maintained through repeated local applications of DA, suggesting that lobinaline N-oxide is poorly displaced from the DAT by DA, and making it different from most other known DAT inhibitors. This effect of lobinaline N-oxide on DA peak height is consistent with inhibition of the DAT, and with its effects on synaptosomal [3H]DA uptake. However, the two metabolites also appeared to produce different effects on DA clearance after the peak, with lobinaline producing the expected transient reduction in rate of clearance, whereas lobinaline N-oxide caused complex changes consistent with a reduced rate of DA clearance immediately after microinjection of lobinaline N-oxide followed by an increase in clearance parameters later in the series of DA microinjections. These effects of lobinaline N-oxide are not compatible with purely inhibitory effects on DA "uptake" by the DAT, and suggest a complex modulatory effect on the DAT.

Some of these differences between effects of lobinaline and lobinaline N-oxide and differences between effects on [3H]DA uptake in vitro and DA signals in vivo may be related to the marked differences in aqueous and lipid solubility between the metabolites. Regardless of the reasons, the data suggest that the N-oxides are more interesting and more druggable leads than lobinaline, and that their novel characteristics may have therapeutic value.

It will be understood that various details of the presently disclosed subject matter can be changed without departing from the scope of the subject matter disclosed herein.

Furthermore, the foregoing description is for the purpose of illustration only, and not for the purpose of limitation.

All publications, patents, and patent applications mentioned in this specification are herein incorporated by reference to the same extent as if each individual publication, patent, or patent application was specifically and individually indicated to be incorporated by reference, including the references set forth in the following list:

REFERENCES

1. Peacock A, Leung J, Larney S, Colledge S, Hickman M, Rehm J, Giovino G A, West R, Hall W, Griffiths P, Ali R, Gowing L, Marsden J, Ferrari A J, Grebely J, Farrell M, Degenhardt L. Global statistics on alcohol, tobacco and illicit drug use: 2017 status report. Addiction. 2018 October; 113(10):1905-1926
2. Littleton J, Barron S, Prendergast M, Nixon S J. Smoking kills (alcoholics)! shouldn't we do something about it? Alcohol Alcohol. 2007 May-June; 42(3):167-73
3. Falk D E, Castle I J, Ryan M, Fertig J, Litten R Z. Moderators of Varenicline Treatment Effects in a Double-Blind, Placebo-Controlled Trial for Alcohol Dependence: An Exploratory Analysis. J Addict Med. 2015 July-August; 9(4):296-303
4. Nicholson E R, Dilley J E, Froehlich J C Co-Administration of Low-Dose Naltrexone and Bupropion Reduces Alcohol Drinking in Alcohol-Preferring (P) Rats Alcohol Clin Exp Res. 2018 March; 42(3):571-577
5. Brown D P, Rogers D T, Pomerleau F, Siripurapu K B, Kulshrestha M, Gerhardt G A, Littleton J M Novel multifunctional pharmacology of lobinaline, the major alkaloid from *Lobelia cardinalis*. Fitoterapia. 2016 June; 111:109-23.
6. Littleton J M. The future of plant drug discovery. Expert Opinion on drug discovery. 1: 673-683, 2007
7. Pichersky E & Gang D R: Genetics and biochemistry of secondary metabolites in plants: an evolutionary perspective. Trends Plant Sci (2000) 5: 439-445
8. Brown D P, Rogers D T, Gunj an S K, Gerhardt G A, Littleton J M. Target-directed discovery and production of pharmaceuticals in transgenic mutant plant cells. J Biotechnol. 2016 Nov. 20; 238:9-14.
9. Klein J W. Pharmacotherapy for Substance Use Disorders. Med Clin North Am. 2016 July; 100(4):891-910.
10. Koob G F, Volkow N D. Neurocircuitry of addiction. Neuropsychopharmacology. 2010 January; 35(1):217-38.
11. Verrico C D, Haile C N, Newton T F, Kosten T R, De La Garza R 2nd. Pharmacotherapeutics for substance-use disorders: a focus on dopaminergic medications. Expert Opin Investig Drugs. 2013 December; 22(12): 1549-68
12. Zhu J, Reith M E. Role of the dopamine transporter in the action of psychostimulants, nicotine, and other drugs of abuse. CNS Neurol Disord Drug Targets. 2008 November; 7(5):393-409
13. Maggio S E, Saunders M A, Baxter T A, Nixon K, Prendergast M A, Zheng G, Crooks P, Dwoskin L P, Slack R D, Newman A H, Bell R L, Bardo M T. Effects of the nicotinic agonist varenicline, nicotinic antagonist r-bPiDI, and DAT inhibitor (R)-modafinil on co-use of ethanol and nicotine in female P rats. Psychopharmacology (Berl). 2018 May; 235(5):1439-1453
14. Karam-Hage M, Robinson J D, Lodhi A, Brower K J. Bupropion-SR for smoking reduction and cessation in alcohol-dependent outpatients: a naturalistic, open-label study. Curr Clin Pharmacol. 2014 May; 9(2):123-9
15. Kelly J P. Cathinone derivatives: a review of their chemistry, pharmacology and toxicology. Drug Test Anal. 2011 July-August; 3(7-8):439-53
16. Faure P, Tolu S, Valverde S, Naudé J. Role of nicotinic acetylcholine receptors in regulating dopamine neuron activity. Neuroscience. 2014 Dec. 12; 282:86-100.
17. Littleton J. Receptor regulation as a unitary mechanism for drug tolerance and physical dependence—not quite as simple as it seemed! Addiction. 2001 January; 96(1):87-101
18. Cahill K, Lindson-Hawley N, Thomas K H, Fanshawe T R, Lancaster T. Nicotine receptor partial agonists for smoking cessation. Cochrane Database Syst Rev. 2016 May 9; (5):CD006103
19. Jordan C J, Xi Z X. Discovery and development of varenicline for smoking cessation. Expert Opin Drug Discov. 2018 July; 13(7):671-683
20. Rahman S, Engleman E A, Bell R L. Recent Advances in Nicotinic Receptor Signaling in Alcohol Abuse and Alcoholism. Prog Mol Biol Transl Sci. 2016; 137:183-201
21. Roberts W, Harrison E L R, McKee S A. Effects of varenicline on alcohol cue reactivity in heavy drinkers. Psychopharmacology (Berl). 2017 September; 234 (18):2737-2745
22. Chen R, Wu X, Wei H, Han D D, Gu H H. Molecular cloning and functional characterization of the dopamine transporter from Eloria noyesi, a caterpillar pest of cocaine-rich coca plants. Gene. 2006 Jan. 17; 366 (1):152-60.
23. Steppuhn A, Gase K, Krock B, Halitschke R, Baldwin I T. Nicotine's defensive function in nature. PLoS Biol. 2004 August; 2(8):E217
24. Felpin F X, Lebreton J. History, chemistry and biology of alkaloids from *Lobelia inflata*. Tetrahedron. 2004. 60:10127-53.
25. Farook J M, Lewis B, Gaddis J G, Littleton J M, Barron S. Lobeline, a nicotinic partial agonist attenuates alcohol consumption and preference in male C57BL/6J mice. Physiol Behav. 2009 Jun. 22; 97(3-4):503-6
26. Littleton J, Rogers T, Falcone D. Novel approaches to plant drug discovery based on high throughput pharmacological screening and genetic manipulation. Life Sci. 2005 Dec. 22; 78(5):467-75.
27. Manske, R. H. F. (1938). Lobinaline, an alkaloid from *Lobelia cardinalis* L. Can. J. Research 16 B: 445-448.
28. Lipinski C A. Lead- and drug-like compounds: the rule-of-five revolution. Drug Discovery Today Technol. 2004 December; 1(4):337-41
29. Robison, M. M., et al., The skeletal structure of lobinaline. J Org Chem, 1966. 31(10): p. 3206-13.
30. Williams J M, Steketee J D. Characterization of dopamine transport in crude synaptosomes prepared from rat medial prefrontal cortex. J Neurosci Methods. 2004 Aug. 30; 137(2):161-5
31. Gupta, R. N. and I. D. Spenser, Biosynthesis of Lobinaline. Canadian Journal of Chemistry, 1971. 49(3): p. 384-397.
32. Dembitsky V M, Gloriozova T A, Poroikov V V. Naturally occurring plant isoquinoline N-oxide alkaloids: their pharmacological and SAR activities. Phytomedicine. 2015 Jan. 15; 22(1):183-202

33. Zolkowska D, Jain R, Rothman R B, Partilla J S, Roth B L, Setola V, Prisinzano T E, Baumann M H. Evidence for the involvement of dopamine transporters in behavioral stimulant effects of modafinil. J Pharmacol Exp Ther. 2009 May; 329(2):738-46

34. Damaj M I, Carroll F I, Eaton J B, Navarro H A, Blough B E, Mirza S, Lukas R J, Martin B R. Enantioselective effects of hydroxy metabolites of bupropion on behavior and on function of monoamine transporters and nicotinic receptors. Mol Pharmacol. 2004 September; 66(3):675-82

35. Terry A V Jr, Williamson R, Gattu M, Beach J W, McCurdy C R, Sparks J A, Pauly J R. Lobeline and structurally simplified analogs exhibit differential agonist activity and sensitivity to antagonist blockade when compared to nicotine. Neuropharmacology. 1998; 37(1):93-102

36 Zahniser, N. R., G. A. Larson, and G. A. Gerhardt, In vivo dopamine clearance rate in rat striatum: regulation by extracellular dopamine concentration and dopamine transporter inhibitors. J Pharmacol Exp Ther, 1999. 289(1): p. 266-77.

37. Foster J D, Vaughan R A. Phosphorylation mechanisms in dopamine transporter regulation. J Chem Neuroanat. 2017 October; 83-84:10-18.

38. Mfuh A M, Larionov O V. Heterocyclic N-Oxides—An Emerging Class of Therapeutic Agents. Curr Med Chem. 2015; 22(24):2819-57

39. Kamdar N K, Miller S A, Syed Y M, Bhayana R, Gupta T, Rhodes J S. Acute effects of naltrexone and GBR 12909 on ethanol drinking-in-the-dark in C57BL/6J mice. Psychopharmacology (Berl). 2007 June; 192(2):207-17

40. Crabbe J C, Ozburn A R, Metten P, Barkley-Levenson A, Schlumbohm J P, Spence S E, Hack W R, Huang L C. High Drinking in the Dark (HDID) mice are sensitive to the effects of some clinically relevant drugs to reduce binge-like drinking. Pharmacol Biochem Behav. 2017 September; 160:55-62.

41. Shim I, Javaid J I, Wirtshafter D, Jang S Y, Shin K H, Lee H J, Chung Y C, Chun B G. Nicotine-induced behavioral sensitization is associated with extracellular dopamine release and expression of c-Fos in the striatum and nucleus accumbens of the rat. Behav Brain Res. 2001 June; 121(1-2):137-47

42. Zaniewska M, McCreary A C, Stefański R, Przegaliński E, Filip M. Effect of varenicline on the acute and repeated locomotor responses to nicotine in rats. Synapse. 2008 December; 62(12):935-9.

43. Miller D K, Harrod S B, Green T A, Wong M Y, Bardo M T, Dwoskin L P Lobeline attenuates locomotor stimulation induced by repeated nicotine administration in rats. Pharmacol Biochem Behav. 2003 January; 74(2):279-86.

44. Stancheva S L, Alova L G. Biogenic monoamine uptake by rat brain synaptosomes during aging. Effects of nootropic drugs. Gen Pharmacol. 1994 September; 25(5):981-7.

The invention claimed is:

1. A method for treating a substance use disorder in a subject, comprising:
    administering a pharmaceutically effective amount of a lobinaline N-oxide to a subject diagnosed with a substance use disorder.
2. The method of claim 1, wherein the substance use disorder is alcohol use disorder.
3. The method of claim 1, wherein the substance abuse disorder is nicotine use disorder.
4. The method of claim 1, wherein the therapeutically effective amount of the lobinaline N-oxide is about 25 mg/kg.
5. The method of claim 1, wherein the lobinaline N-oxide is lobinaline mono-N-oxide.
6. The method of claim 1, wherein the lobinaline N-oxide is lobinaline bi-N-oxide.
7. The method of claim 1, wherein the administration is subcutaneous.
8. A method for modulating a dopamine transporter in a cell, comprising:
    administering to the cell an effective amount of a lobinaline N-oxide.
9. The method of claim 8, wherein the effective amount is between about 300 nM and about 3 µM.
10. The method of claim 8, wherein the lobinaline N-oxide is lobinaline mono-N-oxide.
11. The method of claim 8, wherein the lobinaline N-oxide is lobinaline bi-N-oxide.
12. The method of claim 8, wherein the cell is in a subject.
13. The method of claim 12, wherein the administration is subcutaneous.
14. A method of modulating a nicotinic acetylcholine receptor in a cell, comprising: administering to the cell an effective amount of a lobinaline N-oxide.
15. The method of claim 14, wherein the effective amount is about 100 µM to about 500 µM.
16. The method of claim 14, wherein lobinaline mono-N-oxide is administered to the cell.
17. The method of claim 14, wherein lobinaline bi-N-oxide is administered to the cell.
18. The method of claim 14, wherein the cell is in a subject.
19. The method of claim 18, wherein the administration is subcutaneous.

* * * * *